United States Patent
Tamminen et al.

(10) Patent No.: US 9,390,246 B2
(45) Date of Patent: Jul. 12, 2016

(54) CREATING SECURE ORIGINAL EQUIPMENT MANUFACTURER (OEM) IDENTIFICATION

(71) Applicants: Rauno Tamminen, Tampere (FI); Jari Lukkarila, Hyvinkää (FI); Uttam Sengupta, Portland, OR (US)

(72) Inventors: Rauno Tamminen, Tampere (FI); Jari Lukkarila, Hyvinkää (FI); Uttam Sengupta, Portland, OR (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 14/036,414

(22) Filed: Sep. 25, 2013

(65) Prior Publication Data

US 2015/0086019 A1 Mar. 26, 2015

(51) Int. Cl.
*H04L 9/08* (2006.01)
*G06F 21/32* (2013.01)
*G06F 21/31* (2013.01)
*G09C 1/00* (2006.01)

(52) U.S. Cl.
CPC .............. *G06F 21/32* (2013.01); *G06F 21/31* (2013.01); *G09C 1/00* (2013.01); *H04L 9/0819* (2013.01); *H04L 2209/12* (2013.01); *H04L 2209/127* (2013.01)

(58) Field of Classification Search
CPC ....... G06F 21/73; G06F 21/572; G06F 21/60; G06F 21/602; G06F 21/62; G06F 21/6209; G06F 21/6218; G06F 21/64
See application file for complete search history.

(56) References Cited

U.S. PATENT DOCUMENTS

| 2005/0005098 A1* | 1/2005 | Michaelis et al. ............ 713/156 |
| 2005/0180572 A1* | 8/2005 | Graunke ....................... 380/277 |
| 2006/0129848 A1* | 6/2006 | Paksoy et al. ................. 713/193 |
| 2006/0218649 A1* | 9/2006 | Brickell et al. ................. 726/27 |
| 2013/0254906 A1* | 9/2013 | Kessler et al. ................. 726/34 |
| 2014/0358792 A1* | 12/2014 | Berke et al. ..................... 705/50 |

* cited by examiner

*Primary Examiner* — Samson Lemma
*Assistant Examiner* — Arya Golriz
(74) *Attorney, Agent, or Firm* — Lowenstein Sandler LLP

(57) ABSTRACT

A processing device implementing creation of secure Original Equipment Manufacturer (OEM) identifiers (IDs) in a processing device is disclosed. A processing device of the disclosure includes a one-time programmable storage device and an execution unit. The execution unit can implement a one-way cryptographic hash function that is to receive a secret OEM key from an OEM system, generate an OEM public ID from the secret OEM key, and send the OEM public ID to the one-time programmable storage device for storage.

12 Claims, 15 Drawing Sheets

Receive secret OEM key as input to one-way cryptographic hash function
210

Transform, using the one-way cryptographic hash function, the secret OEM key into an OEM-specific public ID
220

Route the OEM public ID from the one-way cryptographic hash function via a single path to one-time programmable storage, wherein the one-time programmable storage is only programmable from the one-way cryptographic function
230

Store the OEM public ID in the one-time programmable storage
240

Retrieve OEM public ID embedded in processing device for use as input to a one-way cryptographic hash function
410

Retrieve global key embedded in processing device for use as input to the one-way cryptographic hash function
420

Generate, using the one-way cryptographic hash function, a derived OEM key from the OEM public ID and the global key
430

Provide OEM key to OEM-owned security firmware and/or to an OEM security environment for use in authentication and security purposes
440

```
┌─────────────────────────────────────────────────────────────────┐
│ Retrieve OEM public ID embedded in processing device for use as │
│                input to a one-way cryptographic hash function   │
│                                                             455 │
└─────────────────────────────────────────────────────────────────┘
                                │
                                ▼
┌─────────────────────────────────────────────────────────────────┐
│ Retrieve global key embedded in processing device for use as    │
│              input to the one-way cryptographic hash function   │
│                                                             460 │
└─────────────────────────────────────────────────────────────────┘
                                │
                                ▼
┌─────────────────────────────────────────────────────────────────┐
│ Generate, using the one-way cryptographic hash function, a      │
│         derived OEM key from the OEM public ID and the global key│
│                                                             465 │
└─────────────────────────────────────────────────────────────────┘
                                │
                                ▼
┌─────────────────────────────────────────────────────────────────┐
│ Generate, using the one-way cryptographic hash function, a      │
│      device public ID from a root key embedded at the processing│
│      device                                                 470 │
└─────────────────────────────────────────────────────────────────┘
                                │
                                ▼
┌─────────────────────────────────────────────────────────────────┐
│ Generate, using the one-way cryptographic hash function, device │
│               key using the OEM key and the device public ID    │
│                                                             475 │
└─────────────────────────────────────────────────────────────────┘
                                │
                                ▼
┌─────────────────────────────────────────────────────────────────┐
│ Provide device key and device public ID to OEM security         │
│   environment for use in authentication, verification, and other│
│   security purposes                                         480 │
└─────────────────────────────────────────────────────────────────┘
```

*FIG. 4B*

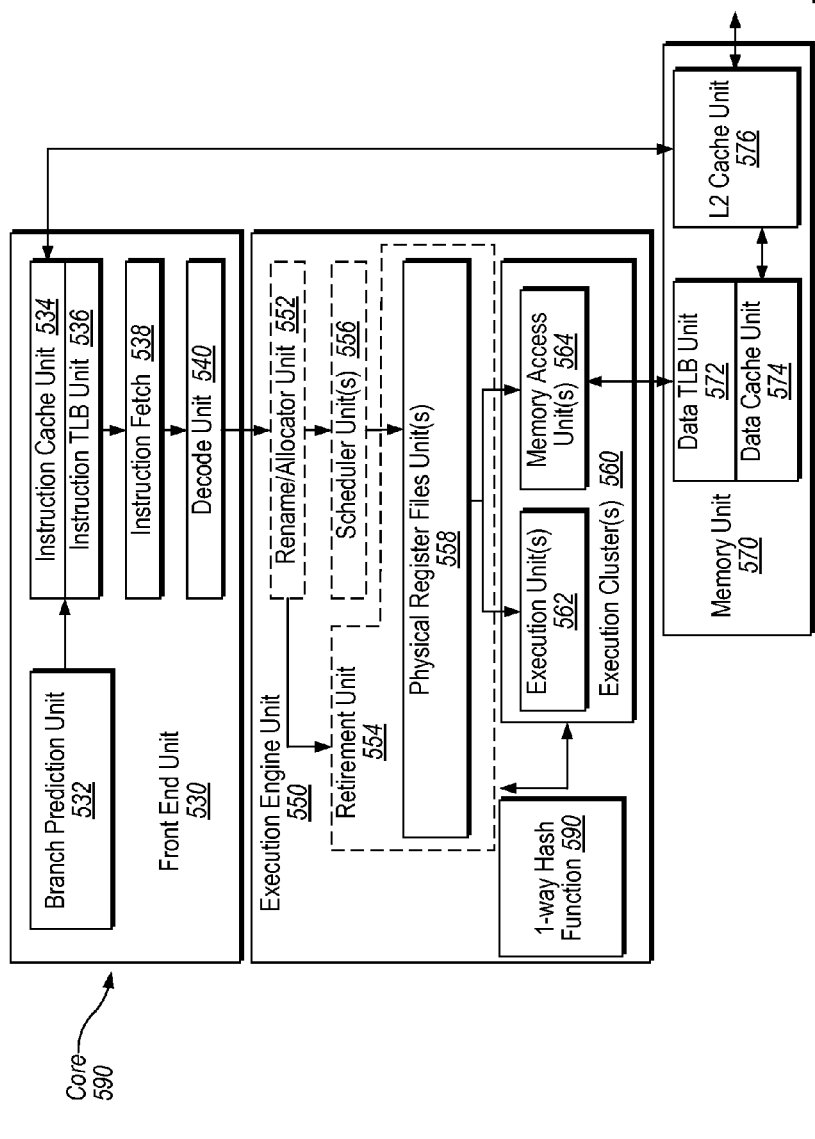
FIG. 5A
FIG. 5B

CREATING SECURE ORIGINAL EQUIPMENT MANUFACTURER (OEM) IDENTIFICATION

TECHNICAL FIELD

The embodiments of the disclosure relate generally to processing devices and, more specifically, relate to creating secure original equipment manufacturer (OEM) identification.

BACKGROUND

Original equipment manufacturers (OEMs), such as mobile handset device manufacturers, aim to protect their software assets running on any of a variety of hardware platforms (e.g., processing device, System-on-a-Chip (SoC), etc.) available in the market. This is because OEMs have assets that create a unique look and feel for their respective devices and these software assets require protection from clone manufacturers who have access to the same hardware platforms and seek to copy the OEM's software asset.

One approach for providing protection for OEMs and their software assets has been to label hardware of the hardware platform with OEM specific identifiers that the OEM software assets could then use for verification purposes. However, in practice, this approach turns generic hardware into non-generic hardware, as the hardware is now programmed specifically for the OEM via the OEM-specific identifier. Programming of the OEM-specific identifiers into hardware platforms should occur in a trusted environment (e.g., before delivering the hardware to OEMs) in order to ensure the correct OEM identifiers are used. This, in turn, causes the hardware manufacturer to have complex inventory management issues and logistics.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

FIG. 2 is a flow diagram illustrating a method for creating secure OEM IDs in a processing device according to an implementation of the disclosure.

FIG. 4A is a flow diagram illustrating a method for deriving OEM keys in a processing device according to an implementation of the disclosure.

FIG. 4B is a flow diagram illustrating a method for deriving device-specific keys in a processing device according to an implementation of the disclosure.

FIG. 5A is a block diagram illustrating a micro-architecture for a processor that implements secure OEM ID creation in which one embodiment of the disclosure may be used.

FIG. 5B is a block diagram illustrating an in-order pipeline and a register renaming stage, out-of-order issue/execution pipeline implemented according to at least one embodiment of the disclosure.

DETAILED DESCRIPTION

Figure 1:
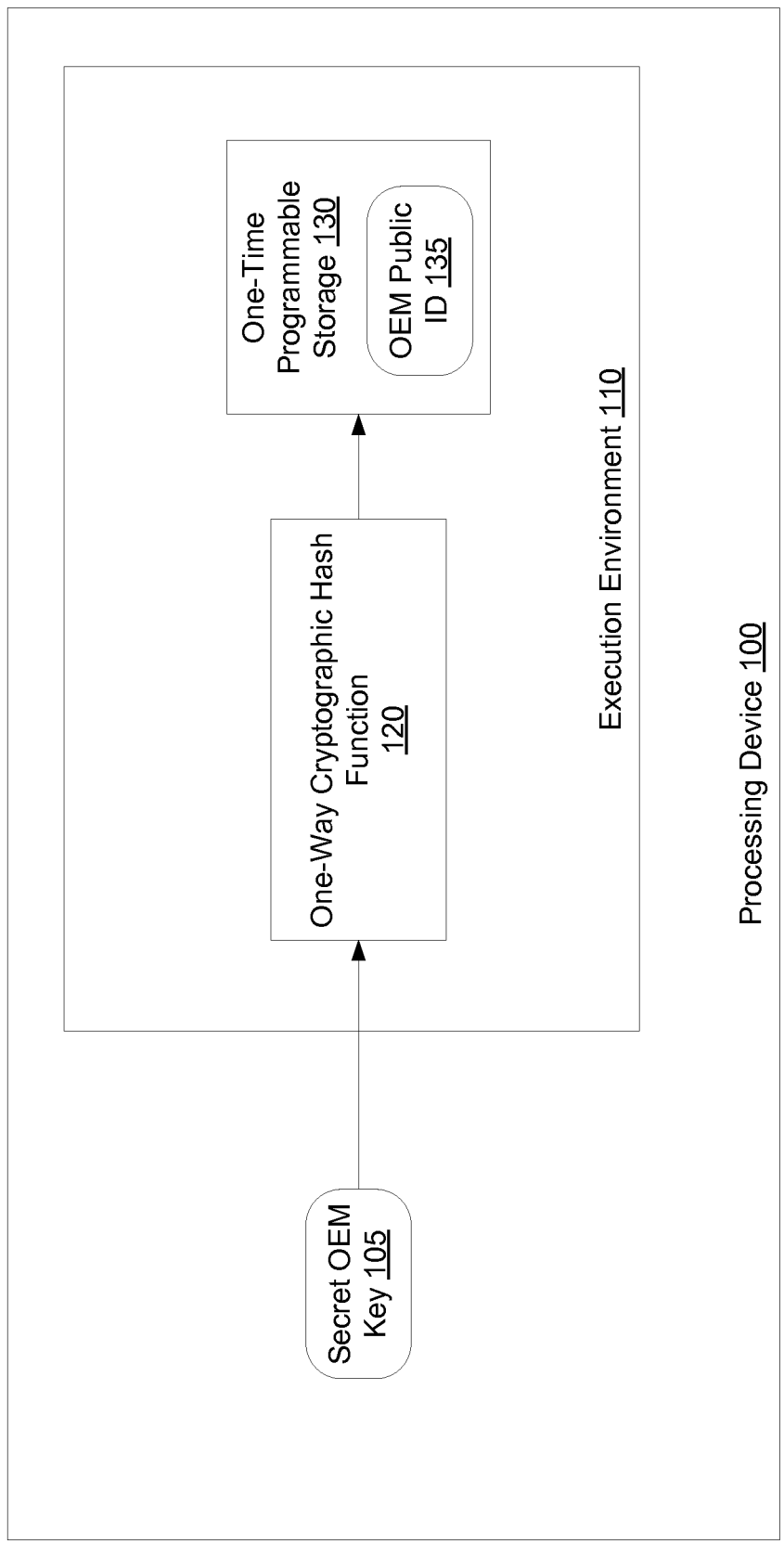
FIG. 1 illustrates a secure Original Equipment Manufacturer (OEM) identifier (ID) creation architecture in accordance with which implementations may operate.

Embodiments of the disclosure implement techniques to create secure Original Equipment Manufacturer (OEM) identifiers (IDs) in a processing device. OEMs manufacture products or components that are purchased by another company and retailed under that purchasing company's brand name. Implementations of the disclosure provide for creation of the secure OEM IDs and the derivation of OEM keys and device-specific keys based on the secure OEM IDs for purposes of security and authentication. More specifically, implementations of the disclosure introduce a one-way hashing function to the processing device to, when provided a secret OEM key by an OEM system, generate an OEM public ID that is programmed into one-time programmable memory (e.g., eFuse) of the processing device. An OEM system may refer to one or more computing devices maintained and run by the OEM. In addition, implementations of the disclosure utilize the generated and embedded OEM public ID of the processor to derive OEM keys and device-specific keys for use by OEM-owned security firmware running on the processing device.

The secure OEM IDs of implementations of the disclosure improve inventory management for hardware platform vendors (e.g., processing device vendor, System-on-a-Chip (SoC) vendor, chipset vendor) and provides flexibility in security offerings provided by the hardware platform vendors. The existing OEM ID solutions are usually limited due to the hardware platform vendor's responsibility of handling programming of the OEM ID on the manufacturing end. Furthermore, the existing solutions are often inflexible in terms of security offerings that a hardware platform vendor can provide and/or support. For example, current hardware platform vendors maintain control of security firmware in order to preserve a chain of trust for security authentications and so on.

In comparison, the secure OEM IDs of the disclosure allow the hardware platform vendor to implement the one-way hashing function for all manufactured products, regardless of the OEM utilizing the product, while still supporting programming of the processing device with OEM-specific public IDs that are under the control of the receiving OEM. Furthermore, the OEM-specific public IDs programmed by the OEMs into the processing device using the one-way hashing function can be utilized in the derivation of OEM keys and device-specific keys that allow OEM-owned security firmware to run on the processing device, without exposing hardware-platform specific secrets (such as global keys of the hardware platform vendors) and the OEM-specific OEM keys. In the case of any OEM-owned security firmware vulnerability, these OEM keys and device-specific keys prevent class attacks on OEM devices and attacks on other OEMs.

Although the following embodiments may be described with reference to specific integrated circuits, such as in computing platforms or microprocessors, other embodiments are applicable to other types of integrated circuits and logic devices. Similar techniques and teachings of embodiments described herein may be applied to other types of circuits or semiconductor devices. For example, the disclosed embodiments are not limited to desktop computer systems or Ultrabooks™. And may be also used in other devices, such as handheld devices, tablets, other thin notebooks, systems on a chip (SOC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below.

Although the following embodiments are described with reference to a processor, other embodiments are applicable to other types of integrated circuits and logic devices. Similar techniques and teachings of embodiments of the disclosure can be applied to other types of circuits or semiconductor devices that can benefit from higher pipeline throughput and improved performance. The teachings of embodiments of the disclosure are applicable to any processor or machine that performs data manipulations. However, the present disclosure is not limited to processors or machines that perform 512 bit, 256 bit, 128 bit, 64 bit, 32 bit, or 16 bit data operations and can be applied to any processor and machine in which manipulation or management of data is performed. In addition, the following description provides examples, and the accompanying drawings show various examples for the purposes of illustration. However, these examples should not be construed in a limiting sense as they are merely intended to provide examples of embodiments of the present disclosure rather than to provide an exhaustive list of all possible implementations of embodiments of the present disclosure.

As more computer systems are used in internet, text, and multimedia applications, additional processor support has been introduced over time. In one embodiment, an instruction set may be associated with one or more computer architectures, including data types, instructions, register architecture, addressing modes, memory architecture, interrupt and exception handling, and external input and output (I/O).

In one embodiment, the instruction set architecture (ISA) may be implemented by one or more micro-architectures, which includes processor logic and circuits used to implement one or more instruction sets. Accordingly, processors with different micro-architectures can share at least a portion of a common instruction set. For example, Intel® Pentium 4 processors, Intel® Core™ processors, and processors from Advanced Micro Devices, Inc. of Sunnyvale Calif. implement nearly identical versions of the x86 instruction set (with some extensions that have been added with newer versions), but have different internal designs. Similarly, processors designed by other processor development companies, such as ARM Holdings, Ltd., MIPS, or their licensees or adopters, may share at least a portion a common instruction set, but may include different processor designs. For example, the same register architecture of the ISA may be implemented in different ways in different micro-architectures using new or well-known techniques, including dedicated physical registers, one or more dynamically allocated physical registers using a register renaming mechanism (e.g., the use of a Register Alias Table (RAT), a Reorder Buffer (ROB) and a retirement register file. In one embodiment, registers may include one or more registers, register architectures, register files, or other register sets that may or may not be addressable by a software programmer.

In one embodiment, an instruction may include one or more instruction formats. In one embodiment, an instruction format may indicate various fields (number of bits, location of bits, etc.) to specify, among other things, the operation to be performed and the operand(s) on which that operation is to be performed. Some instruction formats may be further broken defined by instruction templates (or sub formats). For example, the instruction templates of a given instruction format may be defined to have different subsets of the instruction format's fields and/or defined to have a given field interpreted differently. In one embodiment, an instruction is expressed using an instruction format (and, if defined, in a given one of the instruction templates of that instruction format) and specifies or indicates the operation and the operands upon which the operation will operate.

FIG. 1 illustrates a processing device 100 in accordance with which implementations may operate, where the processing device 100 (e.g., processor and/or CPU) implements creation of secure OEM IDs in a processing device. In one implementation, the processing device 100 is part of a System-On-A-Chip (SoC) and may include an execution environment 110. Execution environment 110 provides support for operations ("micro-operations" or "uops") executed by the processing device 100. In one implementation, the execution environment is a trusted execution environment (TEE) on an SoC.

In one implementation, the execution environment 110 provides for creation of a secure OEM ID via programming of the processing device 100 by the OEM at the OEM facility. Programming of the OEM ID is a single time event occurring through a one-way function, such as one-way cryptographic hash function 120. The one-way cryptographic hash function 120 may be a hash function that takes an arbitrary block of data and returns a fixed size bit string, where it is infeasible to determine (e.g., reverse engineer) what the input data was from the output bit string. In one implementation, the one-way cryptographic hash function 120 is a secure SHA hash algorithm. In some implementations, the one-way cryptographic hash function 120 can be implemented as a hardware block in an eFuse controller or as a trusted software function in an eFuse driver of the execution environment 100.

In one implementation, one-way cryptographic hash function 120 transforms an OEM specific secret key 105, maintained by the OEM at the OEM secure facility, into an OEM-specific public ID 135. As the programming of the OEM ID 135 happens as a one-time event through the one-way cryptographic hash function 120, an OEM ID 135 cannot be programmed in the execution environment 100 without knowing the corresponding secret OEM key 105.

An OEM can generate secret OEM keys 105 for themselves and use them for programming their unique OEM public IDs 135 stored in one-time programmable storage 130 of the execution environment 110. The one-time programmable storage 130 may include specialized storage that is programmed once solely via the one-way cryptographic hash function 120 and tamper proof so that it cannot be changed during the lifetime of the architecture 100. In one implementation, the one-time programmable storage 130 is a bank of fuses, or eFuses. As such, the OEM public ID 135, once programmed, cannot be produced by anyone else that does not know the secret OEM key 105. The secret OEM key 105 may remain in a secure server of the OEM, while the hardware architecture 100 contains the OEM public ID 135.

The OEM public ID 135 programmed in the processing device 100 can be used by an OEM software asset to recognize genuine hardware before allowing execution to proceed. When an OEM software asset containing the OEM public ID starts to execute, it can read the OEM public ID 135 from the processing device 100. If the ID values match, then execution of the OEM software asset continues. If the ID values do not match, then an error condition occurs and execution is halted.

FIG. 2 is a flow diagram illustrating a method 200 for generating a secure OEM ID programmed in a processing device via one-way hash function according to an implementation of the disclosure. Method 200 may be performed by processing logic that may comprise hardware (e.g., circuitry, dedicated logic, programmable logic, microcode, etc.), software (such as instructions run on a processing device), firmware, or a combination thereof. In one embodiment, method 200 is performed by processing device 100 of FIG. 1.

Method 200 begins at block 210 where a secret OEM key is received as input to a one-way cryptographic hash function of the processing device. The secret OEM key may be maintained and provided by an OEM that receives the processing device as part of a hardware platform to execute OEM assets. The one-way cryptographic hash function may be a hash function that takes an arbitrary block of data and returns a fixed size bit string, where it is infeasible to determine (e.g., reverse engineer) what the input data was from the output bit string. In one implementation, the one-way cryptographic hash function is a secure SHA hash algorithm. At block 220, the one-way cryptographic hash function transforms the secret OEM key into an OEM-specific public ID.

Then, at block 230, the OEM public ID is routed from the one-way cryptographic hash function via a single path to one-time programmable storage. In one implementation, the one-time programmable storage is configured to only be programmable via the one-way cryptographic function. Lastly, at block 240, the OEM public ID is stored in the one-time programmable storage. The one-time programmable storage is persistent storage that is temper proof for the lifetime of the processing device, so that the storage of the OEM public ID in the processing device is secure.

Figure 3A:
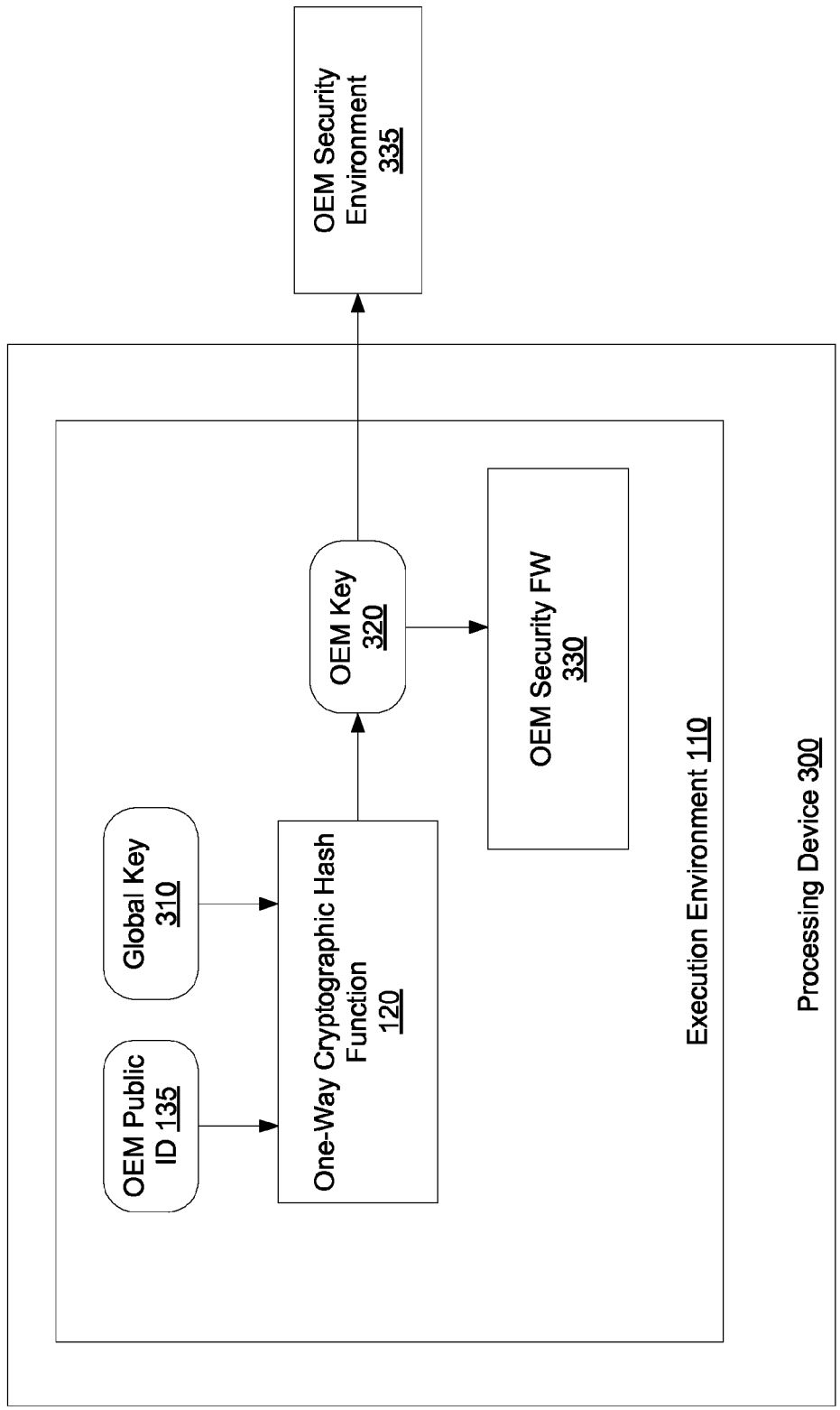
FIG. 3A is a block diagram illustrating an OEM key derivation architecture in which an implementation of the disclosure may operate.

FIG. 3A an exemplary processing device 300 in accordance with which implementations may operate, where the processing device 300 implements derivation of OEM keys for use by OEM-owned security firmware in a processing device. In one implementation, the processing device 300 is part of an SoC and may include an execution environment 110, which is the same as its counterpart described with respect to FIG. 1.

Processing device 300 utilizes a one-way cryptographic hash function 120 and the OEM public ID 135, which are the same as their counterparts discussed with respect to FIG. 1, as part of a security model provided by a hardware platform vendor to protect hardware platform secrets, such as a global security key 310 ("global key"), while allowing an OEM vendor to own, control, sign, and/or modify security firmware 330 on the processing device that utilizes the hardware platform secrets. This may be referred to as a mixed-mode ownership model for security firmware 330. In one implementation, the global key 310 is the same among all hardware devices generated for a particular hardware-platform vendor.

In situations where a hardware platform vendor of the processing device 300 allows an OEM to own or otherwise impact a chain of trust of security firmware 330 on the processing device, a key derived by the security firmware from the global key 310 cannot be trusted. This is because the security firmware 330 handling the global key 310 is owned by a different entity than the global key 310. In addition, use of global key 310 directly by OEM security firmware 330 opens the hardware platform and the OEM up to class attacks.

Processing device 300 addresses this mixed-mode ownership mode preventing the global key 310 from being directly accessed by security FW 330 and removing the direct use of the global key 310 from any authentication steps by security firmware 330. In one implementation, a unique derived OEM key 320 may be generated for use by OEM security firmware 330 for security and authentication purposes. The OEM key 320 may be generated using the embedded one-way cryptographic hash function 120 described above with respect to FIG. 1. The one-way cryptographic hash function 120 transforms inputs including a hardware platform-owned global key 310 embedded in the processing device and the OEM public ID 135 programmed into the processing device 300, as described above with respect to FIGS. 1 and 2.

As discussed above, the OEM has control over the creation of the OEM public ID 135 that is programmed into processing device 300. This OEM public ID 135 cannot be re-produced or programmed at the processing device 300 without knowing the secret OEM key 105 (discussed above with respect to FIG. 1). As a result, the OEM key 320 cannot be re-produced by any other entity than the OEM without knowing the secret OEM key 105 and the global key 310 (which is hardware platform vendor protected). Implementations of the disclosure deliver robust protection even if one OEM is careless with the security firmware 330 by keeping the hardware platform vendor secrets (e.g., global key 310) safe (As security firmware does not read this global key 310 directly). This global key 310 protection offers the additional benefit of protecting other OEMs from attack as well.

In some implementations, the OEM key 320 is also sent to an OEM security environment 335. The OEM security environment 335 may be one or more computing devices (e.g., server devices) operated and managed by the OEM to provide security services, such as authentication and verification services for the OEM. Further explanation of the OEM security environment 335 is discussed below with respect to FIG. 3C.

Figure 3B:
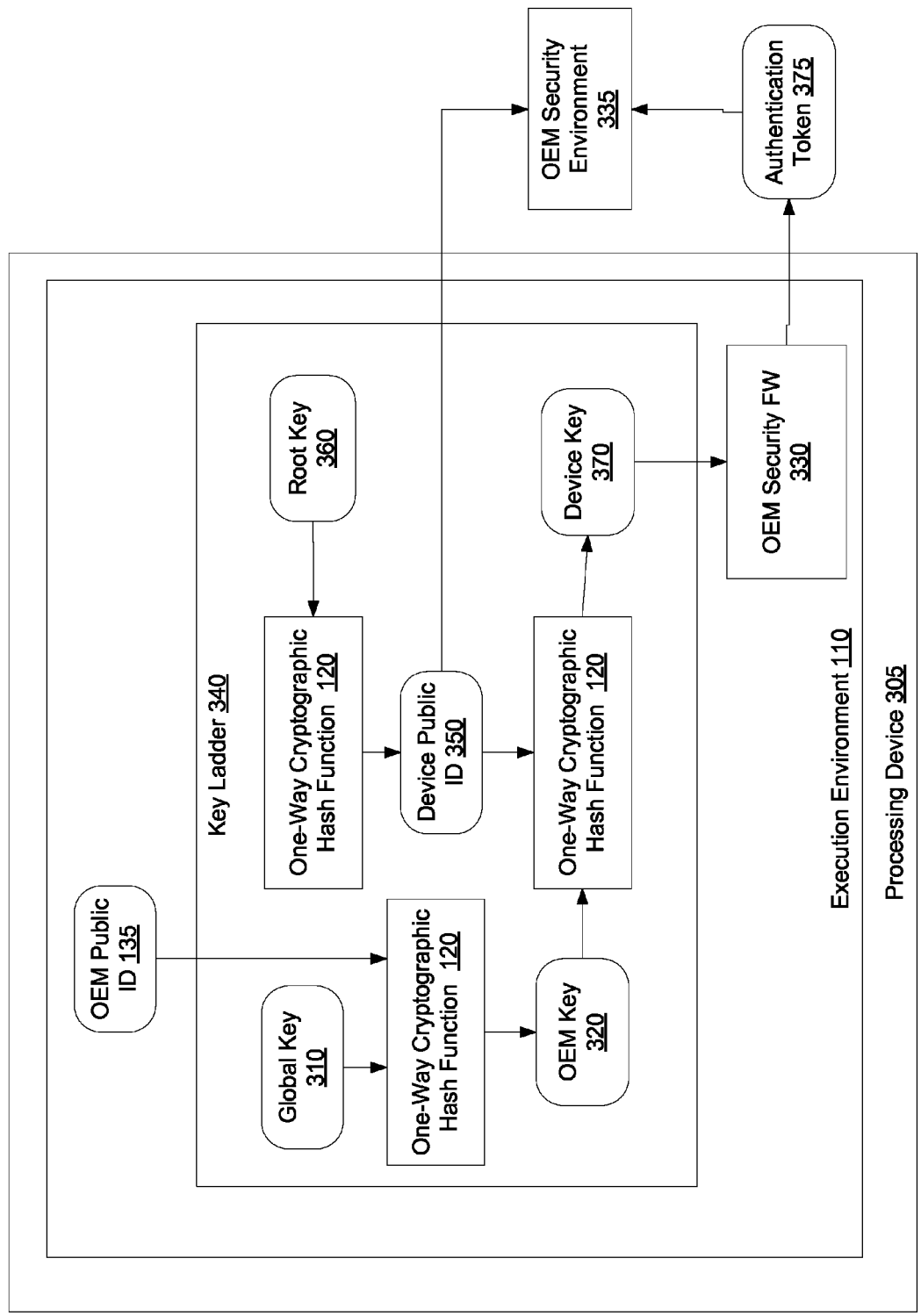
FIG. 3B is a block diagram illustrating a device-specific key derivation architecture in which an implementation of the disclosure may operate.

FIG. 3B is a block diagram illustrating an example processing device 305 in accordance with which implementations may operate, where the processing device 305 implements derivation of a device-specific key for use by OEM-owned security firmware in a processing device. In one implementation, the processing device 305 is part of an SoC and may include an execution environment 110, which is the same as its counterpart described with respect to FIG. 1.

Processing device 305 implements a key ladder 340 to protect the global key 310 and OEM key 320 from OEM security firmware 330. Key ladder 340 is a hardware component of processing device 305 that generates key materials and derives keys. By introducing one-way cryptographic hash function 120 to the key ladder 340, implementations of the disclosure create a secure device authentication scheme for a mixed-mode ownership model of security firmware 330.

As shown in FIG. 3B, the OEM public ID 135 and global key 310 are transformed by one-way cryptographic has function 120 into OEM key 320 similar to processing device 300 of FIG. 3A. However, key ladder 340 further utilizes one-way cryptographic hash function 120 to combine additional key material to protect the global key 310 and OEM key 320 from being revealed to the OEM security firmware 330. The key ladder 340 further utilizes a device-specific secret key, known as root key 360, as input to the one-way cryptographic hash function 120 to generate a device public ID 350. The root key 360 is a unique key specific to the device of processing device 305 that is programmed into fuses of processing device 305 by the hardware platform vendor. The device public ID 350 is combined with the OEM key 320 as input to the one-way cryptographic hash function 120 to generate a derived device key 370. The device key 370 is sent to OEM security firmware 330 within execution environment 110, in order for OEM security firmware 330 to generate an authentication token 375 from the device key 370. In one implementation, the authentication token 375 is generated via a cryptographic operation at the OEM security firmware 330. The authentication token 375, along with the device public ID 350, is sent to OEM security environment 335 to verify the authentication performed by processing device 305, as discussed further below with respect to FIG. 3C.

As a result, in a worst-case scenario where a security flaw is exposed in the security firmware 330, the security model provided by processing device 305 reveals only one device's secret key (e.g., device key 370) so this prevents class attacks on other devices. As vulnerabilities in OEM security firmware 330 cannot be used to compromise the OEM key 320 of the global key 310, class attacks against all OEM devices having the global key 310 are avoided, as well as avoiding attacks against other OEMs than the exposed OEM.

Figure 3C:
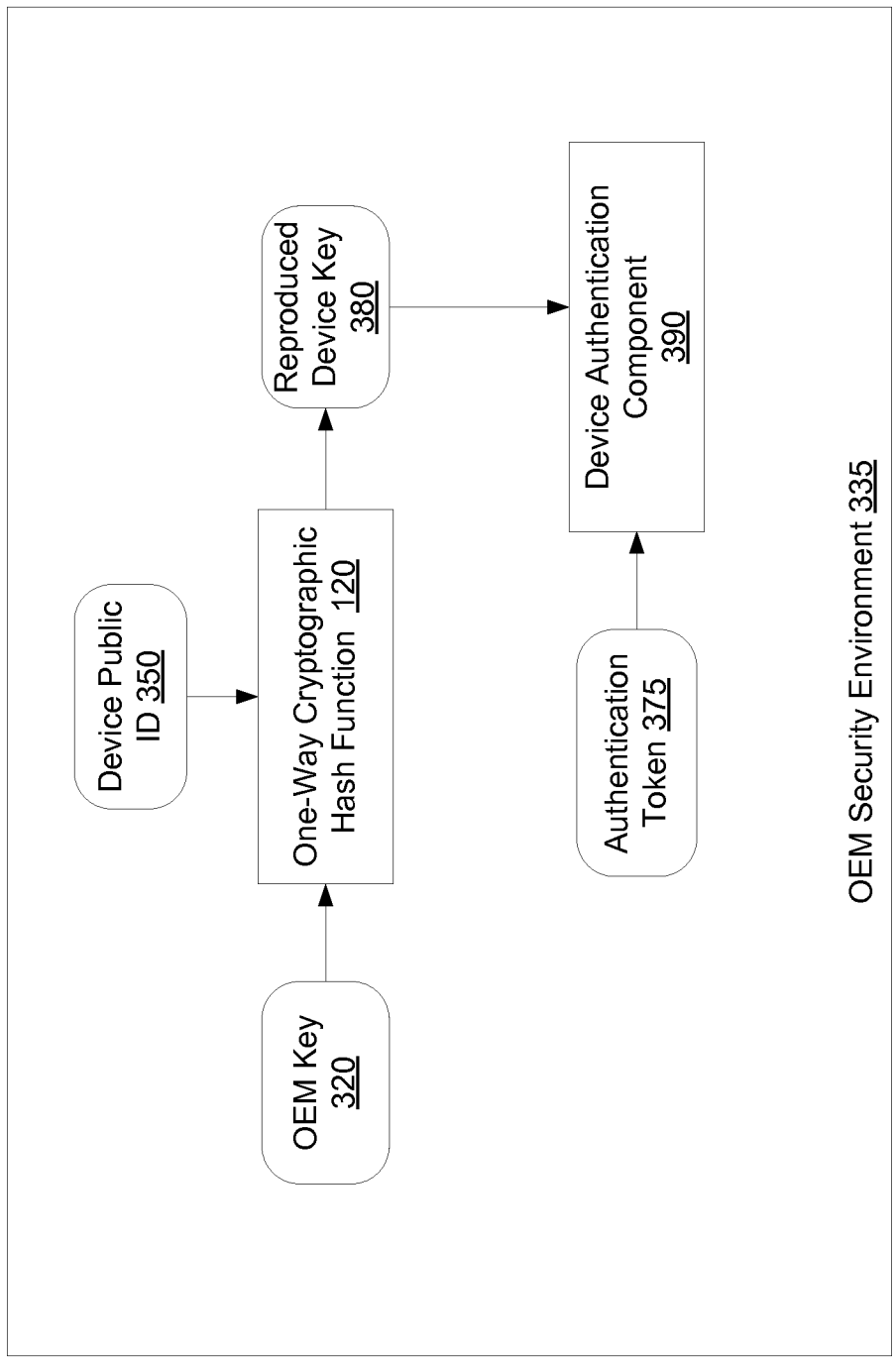
FIG. 3C is a block diagram illustrating an OEM security environment utilized for verifying an authentication based on a derived device-specific key, in which an implementation of the disclosure may operate.

FIG. 3C is a block diagram illustrating an OEM security environment 335 utilized for verifying an authentication based on a derived device-specific key, in which an implementation of the disclosure may operate. OEM security environment 335 may include one or more computing devices, such as server devices, used to provide security services, such as authentication of hardware devices and verification of device authentication procedures. In one implementation, OEM security environment 335 receives the OEM key 320 from FIG. 3A and the device public ID 350 and authentication token 375 from FIG. 3B, and applies a same one-way cryptographic hash function 120 as implemented by the processing device 300, 305 used by OEM. OEM security environment 335 then re-produces a device key 380. The reproduced device key 380 is used by device authentication component 390 to reproduce the cryptographic operation performed by OEM security firmware 330 in FIG. 3B and verify the authenticity of authentication token 375. This is one example of a verification process that OEM security environment may perform for keys produced by processing devices 300, 305 utilized by OEM. Implementations of the disclosure may encompass other authentication and verification procedures that an OEM may perform.

FIG. 4A is a flow diagram illustrating a method 400 for deriving OEM keys for use by OEM-owned security firmware in a processing device according to an implementation of the disclosure. Method 400 may be performed by processing logic that may comprise hardware (e.g., circuitry, dedicated logic, programmable logic, microcode, etc.), software (such as instructions run on a processing device), firmware, or a combination thereof. In one embodiment, method 400 is performed by processing device 300 of FIG. 3A.

Method 400 begins at block 410 where an OEM public ID embedded in the processing device is retrieved for use as input to a one-way cryptographic hash function. The OEM maintains control over the creation of the OEM public ID that is embedded into the processing device by providing a secret OEM key to the one-way cryptographic hash function in order to generate the OEM public ID at the processing device. As discussed above, this OEM public ID cannot be re-produced or programmed at the processing device without knowing the secret OEM key maintained by the OEM.

At block 420, a global key embedded in the processing device is retrieved for use as input to the one-way cryptographic hash function. The global key may be a hardware-platform owned secret key used by the processing device for security and authentication purposes. At block 430, a derived OEM key is generated by the one-way cryptographic hash function using the OEM public ID and the global key. Lastly, at block 440, the OEM key is provided to OEM-owned security firmware and/or to an OEM secure environment for use in authentication and security purposes.

FIG. 4B is a flow diagram illustrating a method 450 for deriving a device-specific key for use by OEM-owned security firmware in a processing device according to an implementation of the disclosure. Method 450 may be performed by processing logic that may comprise hardware (e.g., circuitry, dedicated logic, programmable logic, microcode, etc.), software (such as instructions run on a processing device), firmware, or a combination thereof. In one embodiment, method 450 is performed by processing device 305 of FIG. 3B.

Method 450 begins at block 455 where an OEM public ID embedded in the processing device is retrieved for use as input to a one-way cryptographic hash function. The OEM maintains control over the creation of the OEM public ID that is embedded into the processing device by providing a secret OEM key to the one-way cryptographic hash function in order to generate the OEM public ID at the processing device. As discussed above, this OEM public ID cannot be re-produced or programmed at the processing device without knowing the secret OEM key maintained by the OEM.

At block 460, a global key embedded in the processing device is retrieved for use as input to the one-way cryptographic hash function. The global key may be a hardware-platform owned secret key used by the processing device for security and authentication purposes. The global key may be the same for all hardware platform manufactured by a particular vendor. At block 465, a derived OEM key is generated by the one-way cryptographic hash function using the OEM public ID and the global key.

At block 470, a device public ID is generated by the one-way cryptographic hash function using a root key. In one implementation, the root key is a unique key specific to the individual processing device that is programmed into fuses of the processing device by the hardware platform vendor. Subsequently, at block 475, a device key is generated by the one-way cryptographic hash function using the OEM key and the device public ID. At block 480, the device key are provided to OEM security firmware within an execution environment of the processing device for a cryptographic operation to generate an authentication token from the device key. Lastly, at block 485, the authentication token and the device public ID are provided to an OEM security environment for use in authentication, verification, and other security purposes.

FIG. 5A is a block diagram illustrating a micro-architecture for a processor 500 that implements creating secure OEM IDs in accordance with one embodiment of the disclosure. Specifically, processor 500 depicts an in-order architecture core and a register renaming logic, out-of-order issue/execution logic to be included in a processor according to at least one embodiment of the disclosure.

Processor 500 includes a front end unit 530 coupled to an execution engine unit 550, and both are coupled to a memory unit 570. The processor 500 may include a reduced instruction set computing (RISC) core, a complex instruction set computing (CISC) core, a very long instruction word (VLIW) core, or a hybrid or alternative core type. As yet another option, processor 500 may include a special-purpose core, such as, for example, a network or communication core, compression engine, graphics core, or the like. In one embodiment, processor 500 may be a multi-core processor or may part of a multi-processor system.

The front end unit 530 includes a branch prediction unit 532 coupled to an instruction cache unit 534, which is coupled to an instruction translation lookaside buffer (TLB) 536, which is coupled to an instruction fetch unit 538, which is coupled to a decode unit 540. The decode unit 540 (also known as a decoder) may decode instructions, and generate as an output one or more micro-operations, micro-code entry points, microinstructions, other instructions, or other control signals, which are decoded from, or which otherwise reflect, or are derived from, the original instructions. The decoder 540 may be implemented using various different mechanisms. Examples of suitable mechanisms include, but are not limited to, look-up tables, hardware implementations, programmable logic arrays (PLAs), microcode read only memories (ROMs), etc. The instruction cache unit 534 is further coupled to the memory unit 570. The decode unit 540 is coupled to a rename/allocator unit 552 in the execution engine unit 550.

The execution engine unit 550 includes the rename/allocator unit 552 coupled to a retirement unit 554 and a set of one or more scheduler unit(s) 556. The scheduler unit(s) 556 represents any number of different schedulers, including reservations stations (RS), central instruction window, etc. The scheduler unit(s) 556 is coupled to the physical register file(s) unit(s) 558. Each of the physical register file(s) units 558 represents one or more physical register files, different ones of which store one or more different data types, such as scalar integer, scalar floating point, packed integer, packed floating point, vector integer, vector floating point, etc., status (e.g., an instruction pointer that is the address of the next instruction to be executed), etc. The physical register file(s) unit(s) 558 is overlapped by the retirement unit 554 to illustrate various ways in which register renaming and out-of-order execution may be implemented (e.g., using a reorder buffer(s) and a retirement register file(s), using a future file(s), a history buffer(s), and a retirement register file(s); using a register maps and a pool of registers; etc.).

In one implementation, processor 100 may be the same as processors 100, 300, and 305 described with respect to FIGS. 1, 3A, and 3B. In particular, the execution engine unit 550 may include a one-way hash function 590 that is the same as one-way cryptographic hash function 120 described with respect to FIGS. 1, 3A, and 3B, to implement creating secure OEM IDs described with respect to implementations of the disclosure.

Generally, the architectural registers are visible from the outside of the processor or from a programmer's perspective. The registers are not limited to any known particular type of circuit. Various different types of registers are suitable as long as they are capable of storing and providing data as described herein. Examples of suitable registers include, but are not limited to, dedicated physical registers, dynamically allocated physical registers using register renaming, combinations of dedicated and dynamically allocated physical registers, etc. The retirement unit 554 and the physical register file(s) unit(s) 558 are coupled to the execution cluster(s) 560.

The execution cluster(s) 560 includes a set of one or more execution units 562 and a set of one or more memory access units 564. The execution units 562 may perform various operations (e.g., shifts, addition, subtraction, multiplication) and operate on various types of data (e.g., scalar floating point, packed integer, packed floating point, vector integer, vector floating point).

While some embodiments may include a number of execution units dedicated to specific functions or sets of functions, other embodiments may include only one execution unit or multiple execution units that all perform all functions. The scheduler unit(s) 556, physical register file(s) unit(s) 558, and execution cluster(s) 560 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 564). It should also be understood that where separate pipelines are used, one or more of these pipelines may be out-of-order issue/execution and the rest in-order.

The set of memory access units 564 is coupled to the memory unit 570, which may include a data prefetcher 580, a data TLB unit 572, a data cache unit (DCU) 574, and a level 2 (L2) cache unit 576, to name a few examples. In some embodiments DCU 574 is also known as a first level data cache (L1 cache). The DCU 574 may handle multiple outstanding cache misses and continue to service incoming stores and loads. It also supports maintaining cache coherency. The data TLB unit 572 is a cache used to improve virtual address translation speed by mapping virtual and physical address spaces. In one exemplary embodiment, the memory access units 564 may include a load unit, a store address unit, and a store data unit, each of which is coupled to the data TLB unit 572 in the memory unit 570. The L2 cache unit 576 may be coupled to one or more other levels of cache and eventually to a main memory.

In one embodiment, the data prefetcher 580 speculatively loads/prefetches data to the DCU 574 by automatically predicting which data a program is about to consume. Prefetching may refer to transferring data stored in one memory location of a memory hierarchy (e.g., lower level caches or memory) to a higher-level memory location that is closer (e.g., yields lower access latency) to the processor before the data is actually demanded by the processor. More specifically, prefetching may refer to the early retrieval of data from one of the lower level caches/memory to a data cache and/or prefetch buffer before the processor issues a demand for the specific data being returned.

The processor 500 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.).

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes a separate instruction and data cache units and a shared L2 cache unit, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

FIG. 5B is a block diagram illustrating an in-order pipeline and a register renaming stage, out-of-order issue/execution pipeline implemented by processing device 500 of FIG. 5A according to some embodiments of the disclosure. The solid lined boxes in FIG. 5B illustrate an in-order pipeline, while the dashed lined boxes illustrates a register renaming, out-of-order issue/execution pipeline. In FIG. 5B, a processor pipeline 500 includes a fetch stage 502, a length decode stage 504, a decode stage 506, an allocation stage 508, a renaming stage 510, a scheduling (also known as a dispatch or issue) stage 512, a register read/memory read stage 514, an execute stage 516, a write back/memory write stage 518, an exception handling stage 522, and a commit stage 524. In some embodiments, the ordering of stages 502-524 may be different than illustrated and are not limited to the specific ordering shown in FIG. 5B.

Figure 6:
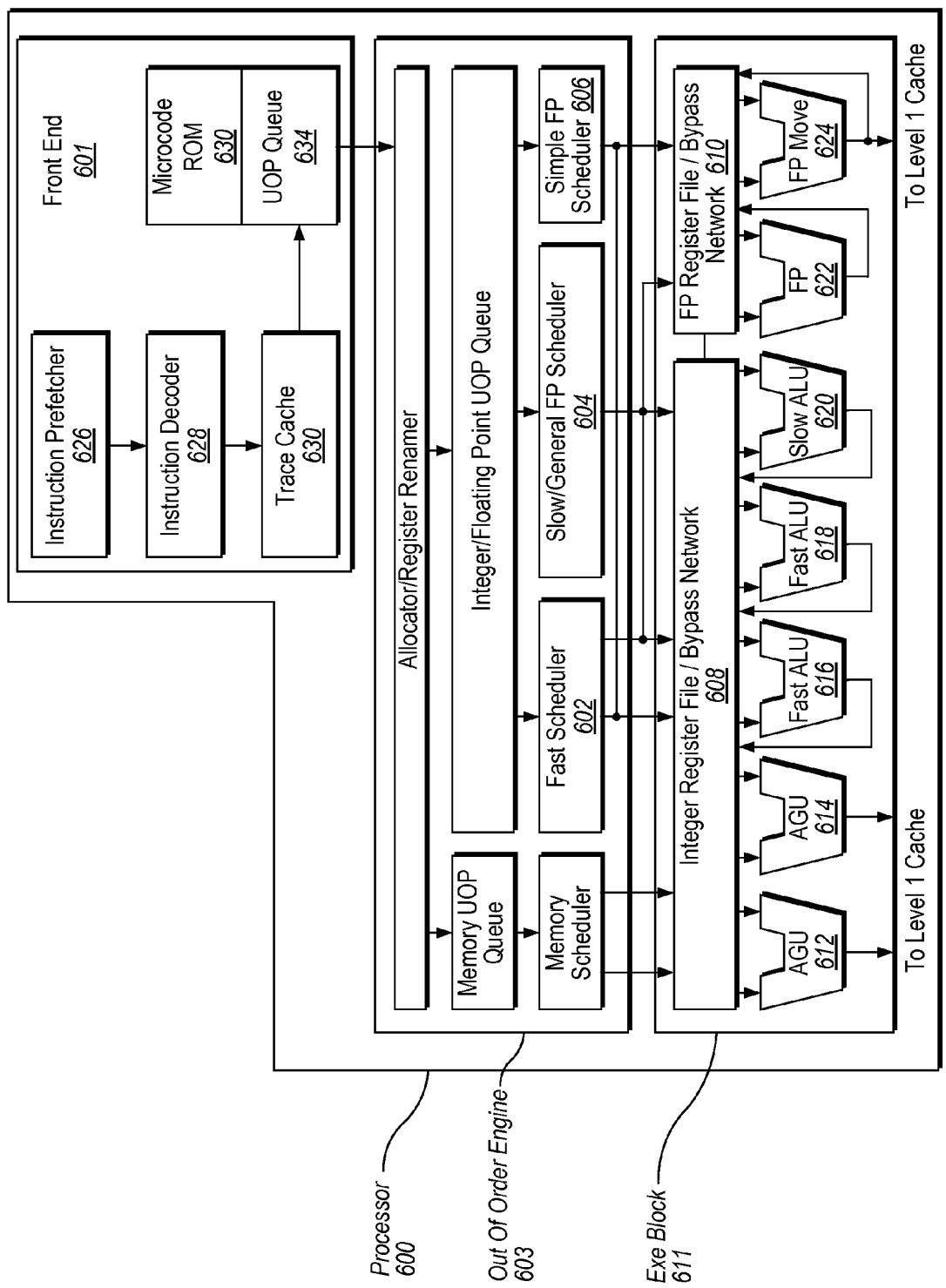
FIG. 6 illustrates a block diagram of the micro-architecture for a processor that includes logic circuits to perform secure OEM ID creation in accordance with one embodiment of the disclosure.

FIG. 6 illustrates a block diagram of the micro-architecture for a processor 600 that includes logic circuits to create secure OEM IDs in accordance with one embodiment of the disclosure. In some embodiments, an instruction in accordance with one embodiment can be implemented to operate on data elements having sizes of byte, word, doubleword, quadword, etc., as well as datatypes, such as single and double precision integer and floating point datatypes. In one embodiment the in-order front end 601 is the part of the processor 600 that fetches instructions to be executed and prepares them to be used later in the processor pipeline.

The front end 601 may include several units. In one embodiment, the instruction prefetcher 626 fetches instructions from memory and feeds them to an instruction decoder 628 which in turn decodes or interprets them. For example, in one embodiment, the decoder decodes a received instruction into one or more operations called "micro-instructions" or "micro-operations" (also called micro op or uops) that the machine can execute. In other embodiments, the decoder parses the instruction into an opcode and corresponding data and control fields that are used by the micro-architecture to perform operations in accordance with one embodiment. In one embodiment, the trace cache 630 takes decoded uops and assembles them into program ordered sequences or traces in the uop queue 634 for execution. When the trace cache 630 encounters a complex instruction, the microcode ROM 632 provides the uops needed to complete the operation.

Some instructions are converted into a single micro-op, whereas others need several micro-ops to complete the full operation. In one embodiment, if more than four micro-ops are needed to complete an instruction, the decoder 628 accesses the microcode ROM 632 to do the instruction. For one embodiment, an instruction can be decoded into a small number of micro ops for processing at the instruction decoder 628. In another embodiment, an instruction can be stored within the microcode ROM 632 should a number of micro-ops be needed to accomplish the operation. The trace cache 630 refers to an entry point programmable logic array (PLA) to determine a correct micro-instruction pointer for reading the micro-code sequences to complete one or more instructions in accordance with one embodiment from the micro-code ROM 632. After the microcode ROM 632 finishes sequencing micro-ops for an instruction, the front end 601 of the machine resumes fetching micro-ops from the trace cache 630.

The out-of-order execution engine 603 is where the instructions are prepared for execution. The out-of-order execution logic has a number of buffers to smooth out and re-order the flow of instructions to optimize performance as they go down the pipeline and get scheduled for execution. The allocator logic allocates the machine buffers and resources that each uop needs in order to execute. The register renaming logic renames logic registers onto entries in a register file. The allocator also allocates an entry for each uop in one of the two uop queues, one for memory operations and one for non-memory operations, in front of the instruction schedulers: memory scheduler, fast scheduler 602, slow/general floating point scheduler 604, and simple floating point scheduler 606. The uop schedulers 602, 604, 606, determine when a uop is ready to execute based on the readiness of their dependent input register operand sources and the availability of the execution resources the uops need to complete their operation. The fast scheduler 602 of one embodiment can schedule on each half of the main clock cycle while the other schedulers can only schedule once per main processor clock cycle. The schedulers arbitrate for the dispatch ports to schedule uops for execution.

Register files 608, 610, sit between the schedulers 602, 604, 606, and the execution units 612, 614, 616, 618, 620, 622, 624 in the execution block 611. There is a separate register file 608, 610, for integer and floating point operations, respectively. Each register file 608, 610, of one embodiment also includes a bypass network that can bypass or forward just completed results that have not yet been written into the register file to new dependent uops. The integer register file 608 and the floating point register file 610 are also capable of communicating data with the other. For one embodiment, the integer register file 608 is split into two separate register files, one register file for the low order 32 bits of data and a second register file for the high order 32 bits of data. The floating point register file 610 of one embodiment has 128 bit wide entries because floating point instructions typically have operands from 64 to 128 bits in width.

The execution block 611 contains the execution units 612, 614, 616, 618, 620, 622, 624, where the instructions are actually executed. This section includes the register files 608, 610, that store the integer and floating point data operand values that the micro-instructions need to execute. The processor 600 of one embodiment is comprised of a number of execution units: address generation unit (AGU) 612, AGU 614, fast ALU 616, fast ALU 618, slow ALU 620, floating point ALU 622, floating point move unit 624. For one embodiment, the floating point execution blocks 622, 624, execute floating point, MMX, SIMD, and SSE, or other operations. The floating point ALU 622 of one embodiment includes a 64 bit by 64 bit floating point divider to execute divide, square root, and remainder micro-ops. For embodiments of the present disclosure, instructions involving a floating point value may be handled with the floating point hardware.

In one embodiment, the ALU operations go to the high-speed ALU execution units 616, 618. The fast ALUs 616, 618, of one embodiment can execute fast operations with an effective latency of half a clock cycle. For one embodiment, most complex integer operations go to the slow ALU 620 as the slow ALU 620 includes integer execution hardware for long latency type of operations, such as a multiplier, shifts, flag logic, and branch processing. Memory load/store operations are executed by the AGUs 612, 614. For one embodiment, the integer ALUs 616, 618, 620, are described in the context of performing integer operations on 64 bit data operands. In alternative embodiments, the ALUs 616, 618, 620, can be implemented to support a variety of data bits including 16, 32, 128, 256, etc. Similarly, the floating point units 622, 624, can be implemented to support a range of operands having bits of various widths. For one embodiment, the floating point units 622, 624, can operate on 128 bits wide packed data operands in conjunction with SIMD and multimedia instructions.

In one embodiment, the uops schedulers 602, 604, 606, dispatch dependent operations before the parent load has finished executing. As uops are speculatively scheduled and executed in processor 600, the processor 600 also includes logic to handle memory misses. If a data load misses in the data cache, there can be dependent operations in flight in the pipeline that have left the scheduler with temporarily incorrect data. A replay mechanism tracks and re-executes instructions that use incorrect data. Only the dependent operations need to be replayed and the independent ones are allowed to complete. The schedulers and replay mechanism of one embodiment of a processor are also designed to catch instruction sequences for text string comparison operations.

The processor 600 also includes logic to implement store address prediction for memory disambiguation according to embodiments of the disclosure. In one embodiment, the execution block 611 of processor 600 may include a store address predictor (not shown) for implementing store address prediction for memory disambiguation.

The term "registers" may refer to the on-board processor storage locations that are used as part of instructions to identify operands. In other words, registers may be those that are usable from the outside of the processor (from a programmer's perspective). However, the registers of an embodiment should not be limited in meaning to a particular type of circuit. Rather, a register of an embodiment is capable of storing and providing data, and performing the functions described herein. The registers described herein can be implemented by circuitry within a processor using any number of different techniques, such as dedicated physical registers, dynamically allocated physical registers using register renaming, combinations of dedicated and dynamically allocated physical registers, etc. In one embodiment, integer registers store thirty-two bit integer data. A register file of one embodiment also contains eight multimedia SIMD registers for packed data.

For the discussions below, the registers are understood to be data registers designed to hold packed data, such as 64 bits wide MMX™ registers (also referred to as 'mm' registers in some instances) in microprocessors enabled with MMX technology from Intel Corporation of Santa Clara, Calif. These MMX registers, available in both integer and floating point forms, can operate with packed data elements that accompany SIMD and SSE instructions. Similarly, 128 bits wide XMM registers relating to SSE2, SSE3, SSE4, or beyond (referred to generically as "SSEx") technology can also be used to hold such packed data operands. In one embodiment, in storing packed data and integer data, the registers do not need to differentiate between the two data types. In one embodiment, integer and floating point are either contained in the same register file or different register files. Furthermore, in one embodiment, floating point and integer data may be stored in different registers or the same registers.

Figure 7:
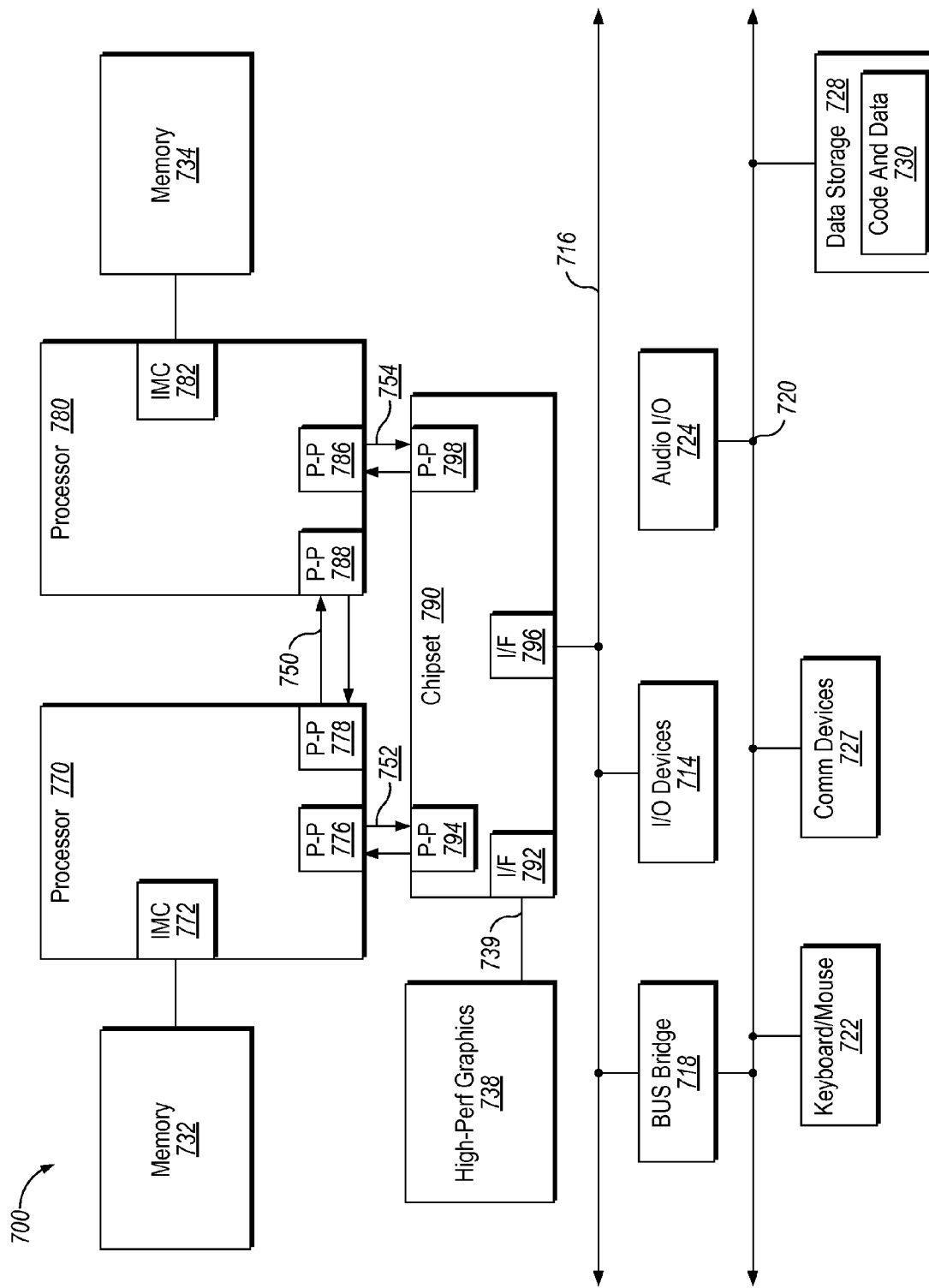
FIG. 7 is a block diagram illustrating a system in which an embodiment of the disclosure may be used.

Referring now to FIG. 7, shown is a block diagram illustrating a system 700 in which an embodiment of the disclosure may be used. As shown in FIG. 7, multiprocessor system 700 is a point-to-point interconnect system, and includes a first processor 770 and a second processor 780 coupled via a point-to-point interconnect 750. While shown with only two processors 770, 780, it is to be understood that the scope of embodiments of the disclosure is not so limited. In other embodiments, one or more additional processors may be present in a given processor. In one embodiment, the multiprocessor system 700 may implement create secure OEM IDs as described herein.

Processors 770 and 780 are shown including integrated memory controller units 772 and 782, respectively. Processor 770 also includes as part of its bus controller units point-to-point (P-P) interfaces 776 and 778; similarly, second processor 780 includes P-P interfaces 786 and 788. Processors 770, 780 may exchange information via a point-to-point (P-P) interface 750 using P-P interface circuits 778, 788. As shown in FIG. 7, IMCs 772 and 782 couple the processors to respective memories, namely a memory 732 and a memory 734, which may be portions of main memory locally attached to the respective processors.

Processors 770, 780 may each exchange information with a chipset 790 via individual P-P interfaces 752, 754 using point to point interface circuits 776, 794, 786, 798. Chipset 790 may also exchange information with a high-performance graphics circuit 738 via a high-performance graphics interface 739.

A shared cache (not shown) may be included in either processor or outside of both processors, yet connected with the processors via P-P interconnect, such that either or both processors' local cache information may be stored in the shared cache if a processor is placed into a low power mode.

Chipset 790 may be coupled to a first bus 716 via an interface 796. In one embodiment, first bus 716 may be a Peripheral Component Interconnect (PCI) bus, or a bus such as a PCI Express bus or another third generation I/O interconnect bus, although the scope of the present disclosure is not so limited.

As shown in FIG. 7, various I/O devices 714 may be coupled to first bus 716, along with a bus bridge 718 which couples first bus 716 to a second bus 720. In one embodiment, second bus 720 may be a low pin count (LPC) bus. Various devices may be coupled to second bus 720 including, for example, a keyboard and/or mouse 722, communication devices 727 and a storage unit 728 such as a disk drive or other mass storage device which may include instructions/code and data 730, in one embodiment. Further, an audio I/O 724 may be coupled to second bus 720. Note that other architectures are possible. For example, instead of the point-to-point architecture of FIG. 7, a system may implement a multi-drop bus or other such architecture.

Figure 8:
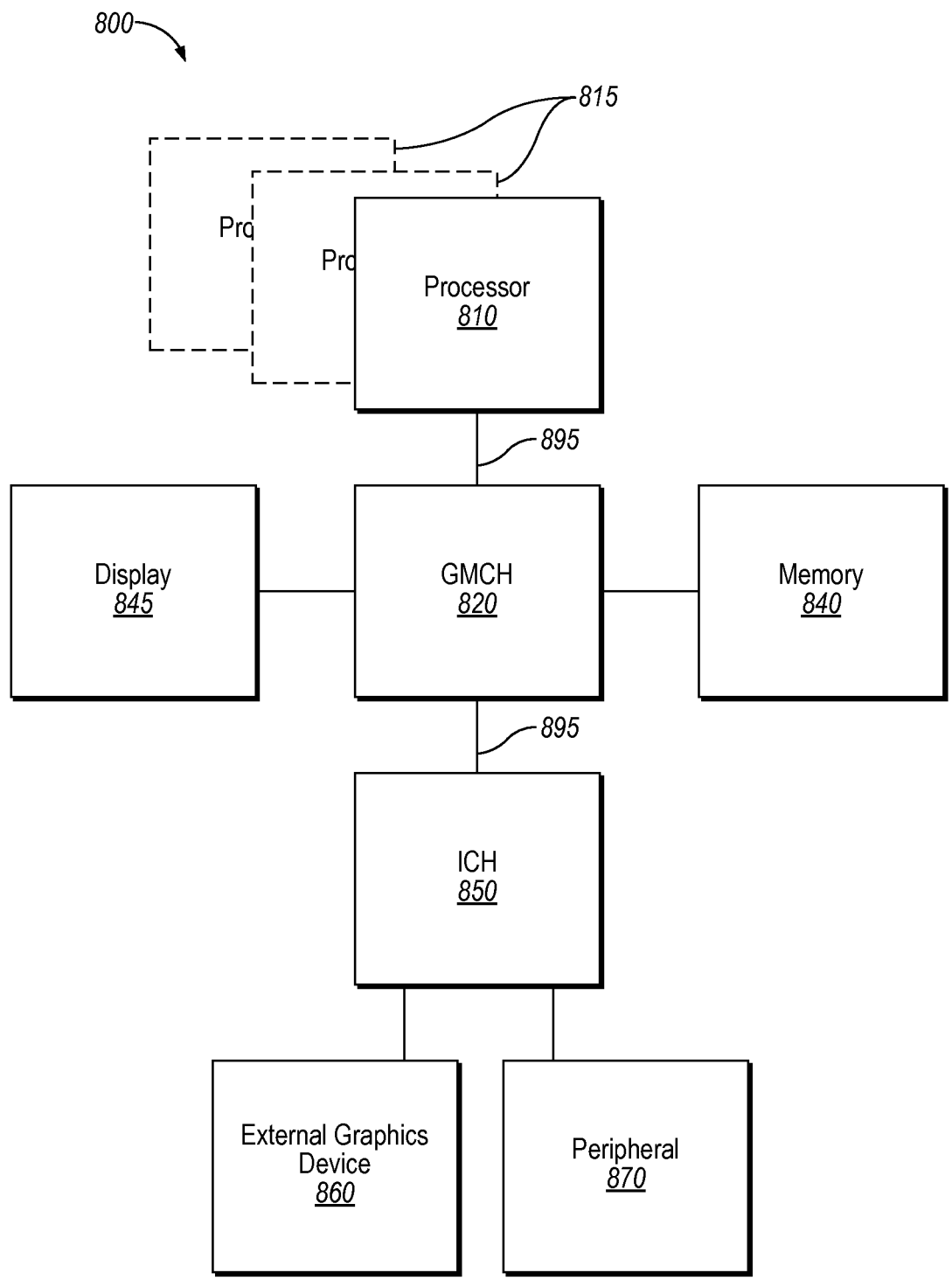
FIG. 8 is a block diagram of a system in which an embodiment of the disclosure may operate.

Referring now to FIG. 8, shown is a block diagram of a system 800 in which one embodiment of the disclosure may operate. The system 800 may include one or more processors 810, 815, which are coupled to graphics memory controller hub (GMCH) 820. The optional nature of additional processors 815 is denoted in FIG. 8 with broken lines. In one embodiment, processors 810, 815 implement creating secure OEM IDs according to embodiments of the disclosure.

Each processor 810, 815 may be some version of the circuit, integrated circuit, processor, and/or silicon integrated circuit as described above. However, it should be noted that it is unlikely that integrated graphics logic and integrated memory control units would exist in the processors 810, 815. FIG. 8 illustrates that the GMCH 820 may be coupled to a memory 840 that may be, for example, a dynamic random access memory (DRAM). The DRAM may, for at least one embodiment, be associated with a non-volatile cache.

The GMCH 820 may be a chipset, or a portion of a chipset. The GMCH 820 may communicate with the processor(s) 810, 815 and control interaction between the processor(s) 810, 815 and memory 840. The GMCH 820 may also act as an accelerated bus interface between the processor(s) 810, 815 and other elements of the system 800. For at least one embodiment, the GMCH 820 communicates with the processor(s) 810, 815 via a multi-drop bus, such as a frontside bus (FSB) 895.

Furthermore, GMCH 820 is coupled to a display 845 (such as a flat panel or touchscreen display). GMCH 820 may include an integrated graphics accelerator. GMCH 820 is further coupled to an input/output (I/O) controller hub (ICH) 850, which may be used to couple various peripheral devices to system 800. Shown for example in the embodiment of FIG. 8 is an external graphics device 860, which may be a discrete graphics device, coupled to ICH 850, along with another peripheral device 870.

Alternatively, additional or different processors may also be present in the system 800. For example, additional processor(s) 815 may include additional processors(s) that are the same as processor 810, additional processor(s) that are heterogeneous or asymmetric to processor 810, accelerators (such as, e.g., graphics accelerators or digital signal processing (DSP) units), field programmable gate arrays, or any other processor. There can be a variety of differences between the processor(s) 810, 815 in terms of a spectrum of metrics of merit including architectural, micro-architectural, thermal, power consumption characteristics, and the like. These differences may effectively manifest themselves as asymmetry and heterogeneity amongst the processors 810, 815. For at least one embodiment, the various processors 810, 815 may reside in the same die package.

Figure 9:
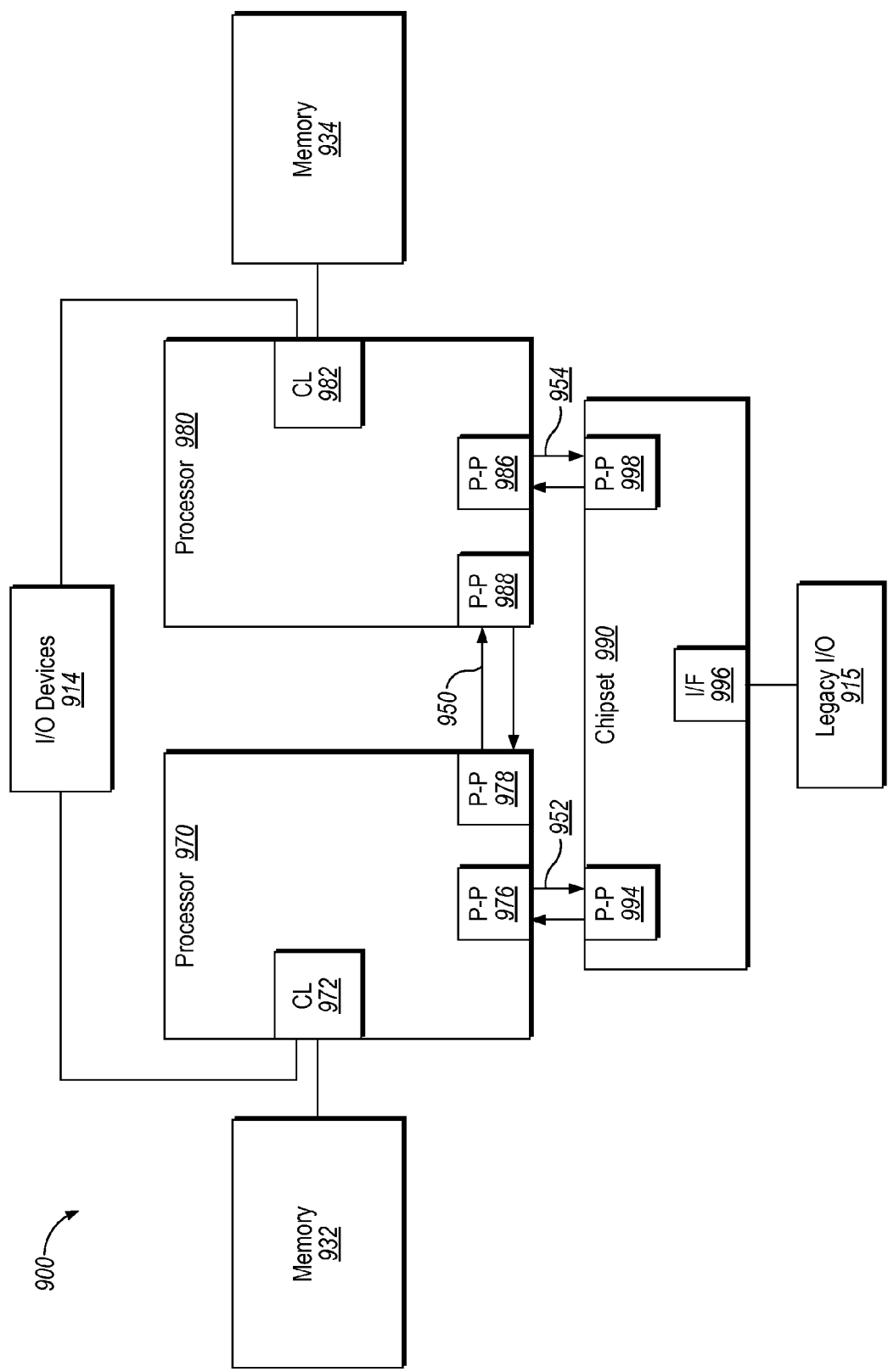
FIG. 9 is a block diagram of a system in which an embodiment of the disclosure may operate.

Referring now to FIG. 9, shown is a block diagram of a system 900 in which an embodiment of the disclosure may operate. FIG. 9 illustrates processors 970, 980. In one embodiment, processors 970, 980 may implement creating secure OEM IDs as described above. Processors 970, 980 may include integrated memory and I/O control logic ("CL") 972 and 982, respectively and intercommunicate with each other via point-to-point interconnect 950 between point-to-point (P-P) interfaces 978 and 988 respectively. Processors 970, 980 each communicate with chipset 990 via point-to-point interconnects 952 and 954 through the respective P-P interfaces 976 to 994 and 986 to 998 as shown. For at least one embodiment, the CL 972, 982 may include integrated memory controller units. CLs 972, 982 may include I/O control logic. As depicted, memories 932, 934 coupled to CLs 972, 982 and I/O devices 914 are also coupled to the control logic 972, 982. Legacy I/O devices 915 are coupled to the chipset 990 via interface 996.

Figure 10:
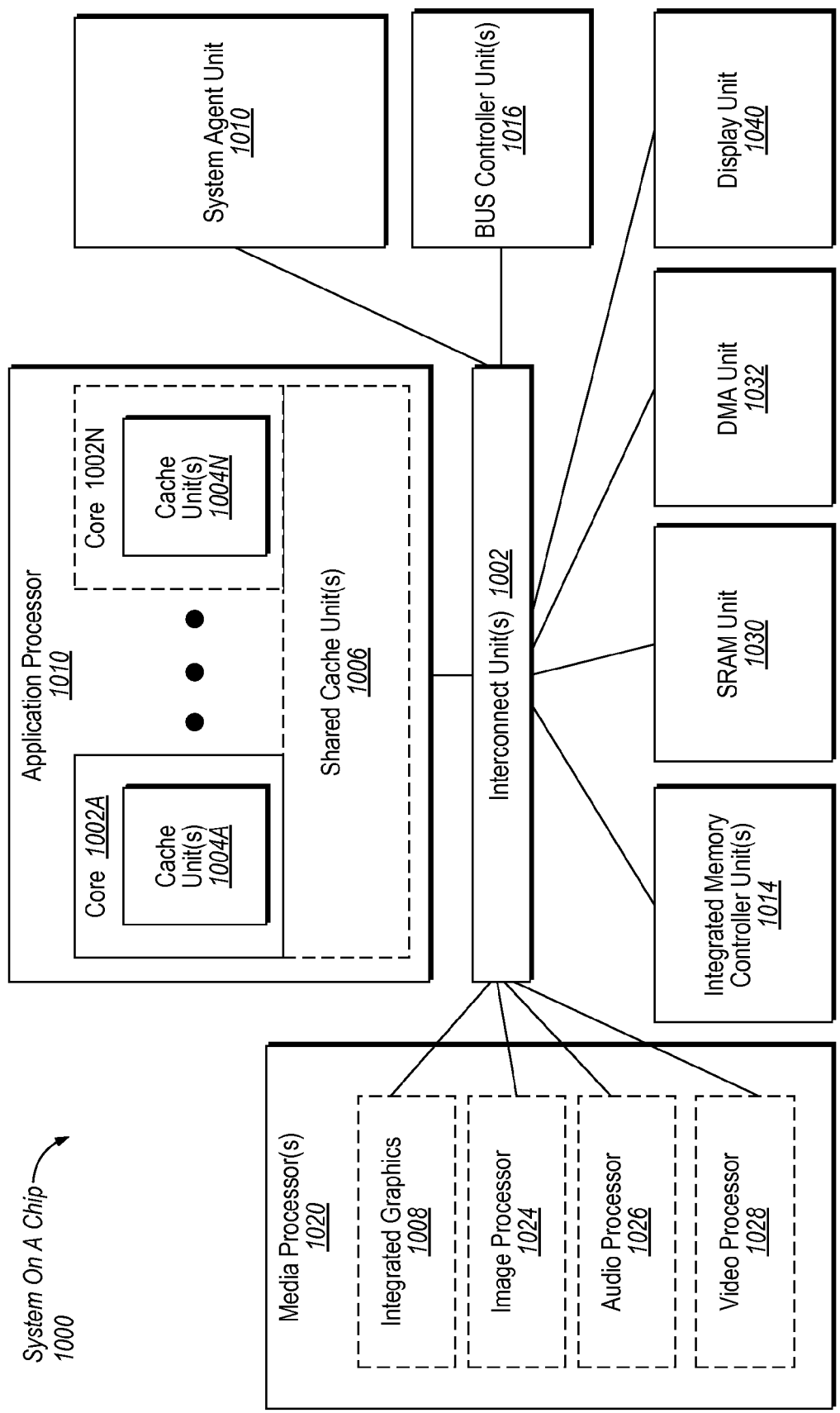
FIG. 10 is a block diagram of a System-on-a-Chip (SoC) in accordance with an embodiment of the present disclosure

Embodiments may be implemented in many different system types. FIG. 10 is a block diagram of a SoC 1000 in accordance with an embodiment of the present disclosure. Dashed lined boxes are optional features on more advanced SoCs. In FIG. 10, an interconnect unit(s) 1012 is coupled to: an application processor 1020 which includes a set of one or more cores 1002A-N and shared cache unit(s) 1006; a system agent unit 1010; a bus controller unit(s) 1016; an integrated memory controller unit(s) 1014; a set or one or more media processors 1018 which may include integrated graphics logic 1008, an image processor 1024 for providing still and/or video camera functionality, an audio processor 1026 for providing hardware audio acceleration, and a video processor 1028 for providing video encode/decode acceleration; an static random access memory (SRAM) unit 1030; a direct memory access (DMA) unit 1032; and a display unit 1040 for coupling to one or more external displays. In one embodiment, a memory module may be included in the integrated memory controller unit(s) 1014. In another embodiment, the memory module may be included in one or more other components of the SoC 1000 that may be used to access and/or control a memory. The application processor 1020 may include a store address predictor for implementing creating secure OEM IDs as described in embodiments herein.

The memory hierarchy includes one or more levels of cache within the cores, a set or one or more shared cache units 1006, and external memory (not shown) coupled to the set of integrated memory controller units 1014. The set of shared cache units 1006 may include one or more mid-level caches, such as level 2 (L2), level 3 (L3), level 4 (L4), or other levels of cache, a last level cache (LLC), and/or combinations thereof.

In some embodiments, one or more of the cores 1002A-N are capable of multi-threading. The system agent 1010 includes those components coordinating and operating cores 1002A-N. The system agent unit 1010 may include for example a power control unit (PCU) and a display unit. The PCU may be or include logic and components needed for regulating the power state of the cores 1002A-N and the integrated graphics logic 1008. The display unit is for driving one or more externally connected displays.

The cores 1002A-N may be homogenous or heterogeneous in terms of architecture and/or instruction set. For example, some of the cores 1002A-N may be in order while others are out-of-order. As another example, two or more of the cores 1002A-N may be capable of execution the same instruction set, while others may be capable of executing only a subset of that instruction set or a different instruction set.

The application processor 1020 may be a general-purpose processor, such as a Core™ i3, i5, i7, 2 Duo and Quad, Xeon™, Itanium™, Atom™ or Quark™ processor, which are available from Intel™ Corporation, of Santa Clara, Calif. Alternatively, the application processor 1020 may be from another company, such as ARM Holdings™, Ltd, MIPS™, etc. The application processor 1020 may be a special-purpose processor, such as, for example, a network or communication processor, compression engine, graphics processor, co-processor, embedded processor, or the like. The application processor 1020 may be implemented on one or more chips. The application processor 1020 may be a part of and/or may be implemented on one or more substrates using any of a number of process technologies, such as, for example, BiCMOS, CMOS, or NMOS.

Figure 11:
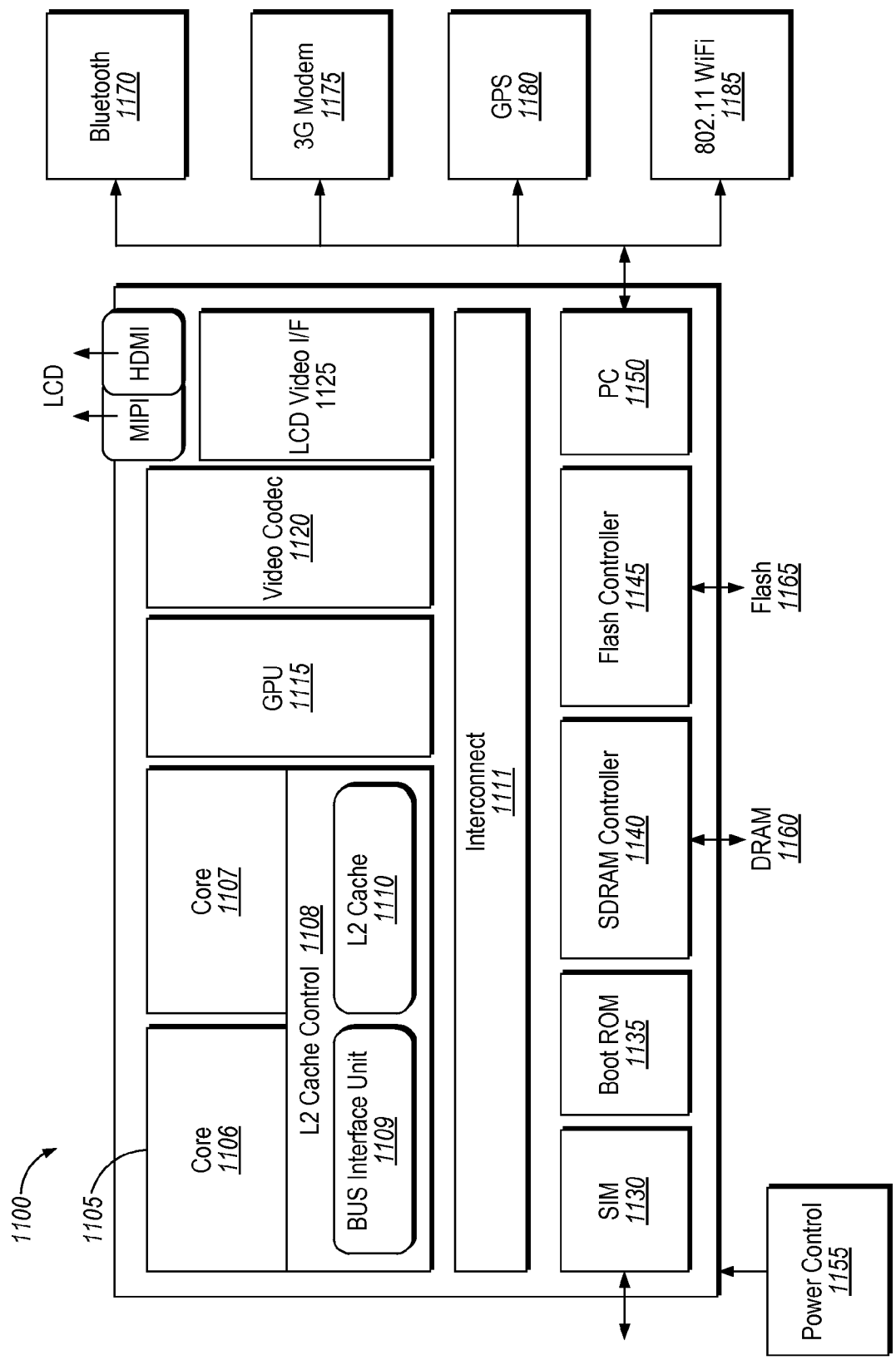
FIG. 11 is a block diagram of an embodiment of an SoC design in accordance with the present disclosure.

FIG. 11 is a block diagram of an embodiment of a system on-chip (SoC) design in accordance with the present disclosure. As a specific illustrative example, SoC 1100 is included in user equipment (UE). In one embodiment, UE refers to any device to be used by an end-user to communicate, such as a hand-held phone, smartphone, tablet, ultra-thin notebook, notebook with broadband adapter, or any other similar communication device. Often a UE connects to a base station or node, which potentially corresponds in nature to a mobile station (MS) in a GSM network.

Here, SOC 1100 includes 2 cores—1106 and 1107. Cores 1106 and 1107 may conform to an Instruction Set Architecture, such as an Intel® Architecture Core™-based processor, an Advanced Micro Devices, Inc. (AMD) processor, a MIPS-based processor, an ARM-based processor design, or a customer thereof, as well as their licensees or adopters. Cores 1106 and 1107 are coupled to cache control 1108 that is associated with bus interface unit 1109 and L2 cache 1110 to communicate with other parts of system 1100. Interconnect 1110 includes an on-chip interconnect, such as an IOSF, AMBA, or other interconnect discussed above, which potentially implements one or more aspects of the described disclosure. In one embodiment, cores 1106, 1107 may implement creating secure OEM IDs as described in embodiments herein.

Interconnect 1110 provides communication channels to the other components, such as a Subscriber Identity Module (SIM) 1130 to interface with a SIM card, a boot ROM 1135 to hold boot code for execution by cores 1106 and 1107 to initialize and boot SoC 1100, a SDRAM controller 1140 to interface with external memory (e.g. DRAM 1160), a flash controller 1145 to interface with non-volatile memory (e.g. Flash 1165), a peripheral control 1150 (e.g. Serial Peripheral Interface) to interface with peripherals, video codecs 1120 and Video interface 1125 to display and receive input (e.g. touch enabled input), GPU 1115 to perform graphics related computations, etc. Any of these interfaces may incorporate aspects of the disclosure described herein. In addition, the system 1100 illustrates peripherals for communication, such as a Bluetooth module 1170, 3G modem 1175, GPS 1180, and Wi-Fi 1185.

Figure 12:
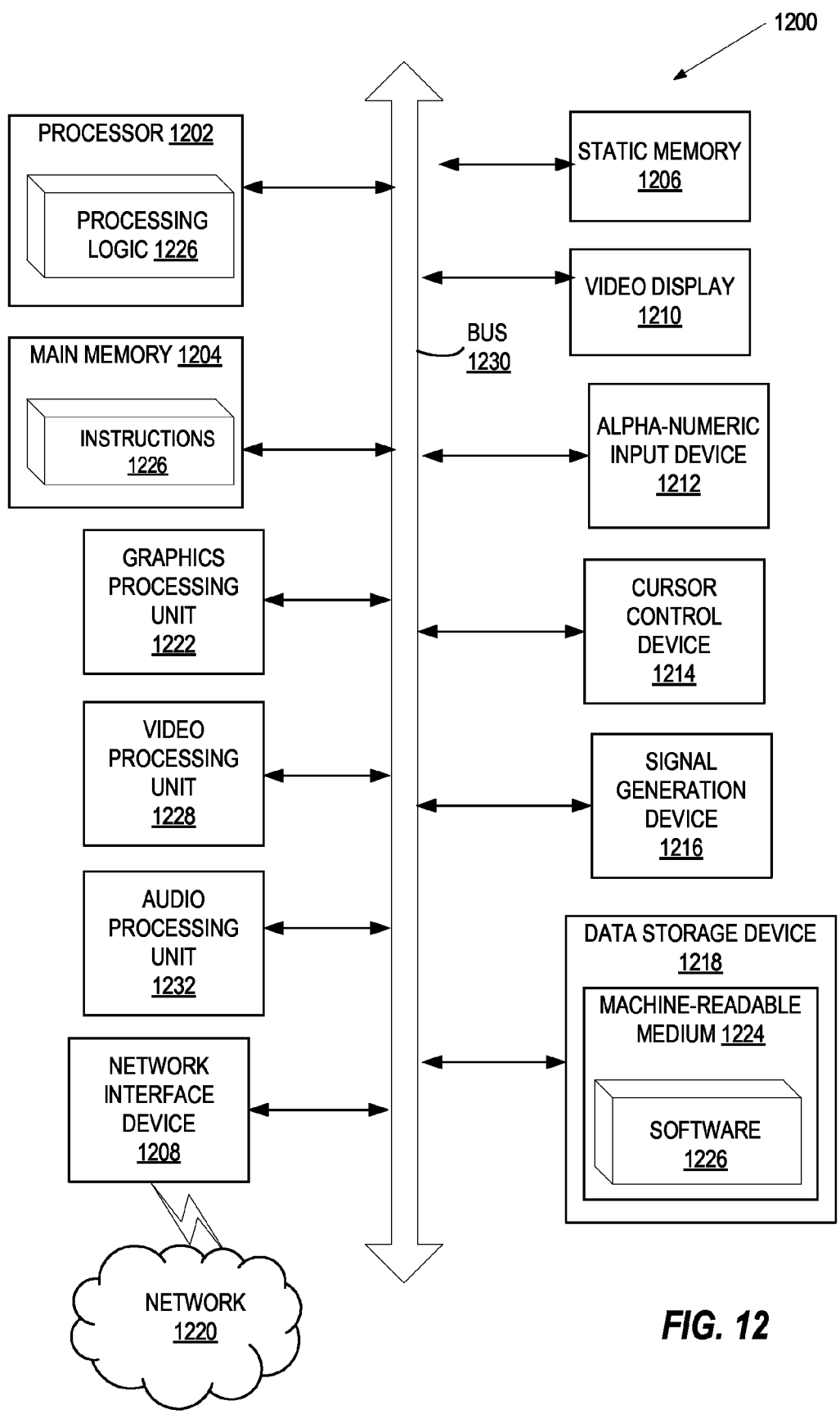
FIG. 12 illustrates a block diagram of one embodiment of a computer system.

FIG. 12 illustrates a diagrammatic representation of a machine in the example form of a computer system 1200 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computer system 1200 includes a processing device 1202, a main memory 1204 (e.g., read-only memory (ROM), flash memory, dynamic random access memory (DRAM) (such as synchronous DRAM (SDRAM) or DRAM (RDRAM), etc.), a static memory 1206 (e.g., flash memory, static random access memory (SRAM), etc.), and a data storage device 1218, which communicate with each other via a bus 1230.

Processing device 1202 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 1202 may also be one or more special-purpose processing devices such as an application specific integrated circuit (ASIC), a field programmable gate array (FPGA), a digital signal processor (DSP), network processor, or the like. In one embodiment, processing device 1202 may include one or processing cores. The processing device 1202 is configured to execute the processing logic 1226 for performing the operations and steps discussed herein. In one embodiment, processing device 1202 is the same as processor architecture 100 described with respect to FIG. 1 that implements creating secure OEM IDs as described herein with embodiments of the disclosure.

The computer system 1200 may further include a network interface device 1208 communicably coupled to a network 1220. The computer system 1200 also may include a video display unit 1210 (e.g., a liquid crystal display (LCD) or a cathode ray tube (CRT)), an alphanumeric input device 1212 (e.g., a keyboard), a cursor control device 1214 (e.g., a mouse), and a signal generation device 1216 (e.g., a speaker). Furthermore, computer system 1200 may include a graphics processing unit 1222, a video processing unit 1228, and an audio processing unit 1232.

The data storage device 1218 may include a machine-accessible storage medium 1224 on which is stored software 1226 implementing any one or more of the methodologies of functions described herein, such as implementing store address prediction for memory disambiguation as described above. The software 1226 may also reside, completely or at least partially, within the main memory 1204 as instructions 1226 and/or within the processing device 1202 as processing logic 1226 during execution thereof by the computer system 1200; the main memory 1204 and the processing device 1202 also constituting machine-accessible storage media.

The machine-readable storage medium 1224 may also be used to store instructions 1226 implementing store address prediction for creating secure OEM IDs such as described with respect to processing devices 100, 300, and 305 in FIGS. 1, 3A, and 3B, and/or a software library containing methods that call the above applications. While the machine-accessible storage medium 1128 is shown in an example embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the present disclosure. The term "machine-accessible storage medium" shall accordingly be taken to include, but not be limited to, solid-state memories, and optical and magnetic media.

The following examples pertain to further embodiments. Example 1 is a processing device for implementing creation of secure Original Equipment Manufacturer (OEM) identifiers (IDs) in a processing device. Further to Example 1, the processing device includes a one-time programmable storage device and an execution unit, coupled to the one-time programmable storage device, to implement a one-way cryptographic hash function. The one-way cryptographic hash function is to receive a secret Original Equipment Manufacturer (OEM) key from an OEM system, generate an OEM public identifier (ID) from the secret OEM key, and send the OEM public ID to the one-time programmable storage device for storage.

In Example 2, the subject matter of Example 1 can optionally include wherein the one-way cryptographic hash function is a SHA hash algorithm. In Example 3, the subject matter of any one of Examples 1-2 can optionally include wherein the one-time programmable storage device is an eFuse. In Example 4, the subject matter of any one of Examples 1-3 can optionally include wherein a software asset of the OEM system compares the OEM public ID stored in the processing device to another OEM public ID of the software asset to determine whether to execute the software asset on the processing device.

In Example 5, the subject matter of any one of Examples 1-4 can optionally include wherein when the OEM public ID does not match the another OEM public ID of the software asset, an error condition is returned and the software asset is not executed by the processing device. In Example 6, the subject matter of any one of Examples 1-5 can optionally include wherein the one-way cryptographic hash function further to receive the OEM public ID from the one-time programmable storage device, receive a global key embedded in the processing device, generate an OEM key using the OEM public ID and the global key as inputs, and provide the OEM key to security firmware executed by the processing device, wherein the security firmware is owned by the OEM system. In Example 7, the subject matter of any one of Examples 1-6 can optionally include wherein the OEM key is used by the security firmware to authenticate the device.

In Example 8, the subject matter of any one of Examples 1-7 can optionally include wherein the one-way cryptographic hash function further to generate an OEM key using the OEM public ID and a global key as inputs, wherein the global key is embedded in the processing device, generate a device public ID from a root key of the processing device, generate a device key from the OEM key and the device public key, and provide the device public ID and an authentication token that is derived from the device key to security firmware executed by the processing device, wherein the security firmware is owned by the OEM system. In Example 9, the subject matter of any one of Examples 1-8 can optionally include wherein the authentication token and the device public ID are used by the security firmware to authenticate the device. All optional features of the apparatus described above may also be implemented with respect to the method or process described herein.

Example 10 is a method for creation of secure Original Equipment Manufacturer (OEM) identifiers (IDs) in a processing device comprising receiving, by a one-way cryptographic hash function executed by a processing device, a secret Original Equipment Manufacturer (OEM) key from an OEM system, generating, by the one-way cryptographic hash function, an OEM public identifier (ID) from the secret OEM key, and sending the OEM public ID to the one-time programmable storage device for storage. In Example 11, the subject matter of Example 10 can optionally include wherein the one-way cryptographic hash function is a SHA hash algorithm. In Example 12, the subject matter of any one of Examples 10-11 can optionally include wherein the one-time programmable storage device is an eFuse.

In Example 13, the subject matter of any one of Examples 10-12 can optionally include wherein a software asset of the OEM system compares the OEM public ID stored in the processing device to another OEM public ID of the software asset to determine whether to execute the software asset on the processing device. In Example 14, the subject matter of any one of Examples 10-13 can optionally include wherein when the OEM public ID does not match the another OEM public ID of the software asset, an error condition is returned and the software asset is not executed by the processing device.

In Example 15, the subject matter of any one of Examples 10-14 can optionally include receiving, by the one-way cryptographic hash function, the OEM public ID from the one-time programmable storage device, receiving, by the one-way cryptographic hash function, a global key embedded in the processing device, generating, by the one-way cryptographic hash function, an OEM key using the OEM public ID and the global key as inputs, and providing the OEM key to security firmware executed by the processing device, wherein the security firmware is owned by the OEM system. In Example 16, the subject matter of any one of Examples 10-15 can optionally include wherein the OEM key is used by the security firmware to authenticate the device.

In Example 17, the subject matter of any one of Examples 10-16 can optionally include generating, by the one-way cryptographic hash function, an OEM key using the OEM public ID and a global key as inputs, wherein the global key is embedded in the processing device, generating, by the one-way cryptographic hash function, a device public ID from a root key of the processing device, generating, by the one-way cryptographic hash function, a device key from the OEM key and the device public key, and providing the device public ID and an authentication token to security firmware executed by the processing device, wherein the security firmware is owned by the OEM system. In Example 18, the subject matter of any one of Examples 10-17 can optionally include wherein the authentication token and the device public ID are used by the security firmware to authenticate the device.

Example 19 is a system for implementing creation of secure Original Equipment Manufacturer (OEM) identifiers (IDs) in a processing device. In Example 19, the system includes a memory and a processing device communicably coupled to the memory. Further to Example 19, the processing device to implement a one-way cryptographic hash function to receive a secret Original Equipment Manufacturer (OEM) key from an OEM system, generate an OEM public identifier (ID) from the secret OEM key, and send the OEM public ID to the one-time programmable storage device for storage.

In Example 20, the subject matter of Example 19 can optionally include wherein the one-way cryptographic hash function is a SHA hash algorithm. In Example 21, the subject matter of any one of Examples 19-20 can optionally include wherein the one-time programmable storage device is an eFuse. In Example 22, the subject matter of any one of Examples 19-21 can optionally include wherein a software asset of the OEM system compares the OEM public ID stored in the processing device to another OEM public ID of the software asset to determine whether to execute the software asset on the processing device.

In Example 23, the subject matter of any one of Examples 19-22 can optionally include wherein when the OEM public ID does not match the another OEM public ID of the software asset, an error condition is returned and the software asset is not executed by the processing device. In Example 24, the subject matter of any one of Examples 19-23 can optionally include wherein the one-way cryptographic hash function further to receive the OEM public ID from the one-time programmable storage device, receive a global key embedded in the processing device, generate an OEM key using the OEM public ID and the global key as inputs, and provide the OEM key to security firmware executed by the processing device, wherein the security firmware is owned by the OEM system.

In Example 25, the subject matter of any one of Examples 19-24 can optionally include wherein the OEM key is used by the security firmware to authenticate the device. In Example 26, the subject matter of any one of Examples 19-25 can optionally include wherein the one-way cryptographic hash function further to generate an OEM key using the OEM public ID and a global key as inputs, wherein the global key is embedded in the processing device, generate a device public ID from a root key of the processing device, generate a device key from the OEM key and the device public key, and provide the device public ID and an authentication token to security firmware executed by the processing device, wherein the security firmware is owned by the OEM system. In Example 27, the subject matter of any one of Examples 19-26 can optionally include wherein the authentication token and the device public ID are used by the security firmware to authenticate the device. All optional features of the system described above may also be implemented with respect to the method or process described herein.

Example 28 is a non-transitory computer-readable medium for implementing creation of secure Original Equipment Manufacturer (OEM) identifiers (IDs) in a processing device. In Example 28, the non-transitory machine-readable medium includes data that, when accessed by a processing device, cause the processing device to perform operations comprising receiving, by a one-way cryptographic hash function executed by a processing device, a secret Original Equipment Manufacturer (OEM) key from an OEM system, generating, by the one-way cryptographic hash function, an OEM public identifier (ID) from the secret OEM key, and sending the OEM public ID to the one-time programmable storage device for storage.

In Example 29, the subject matter of Example 28 can optionally include wherein the one-way cryptographic hash function is a SHA hash algorithm. In Example 30, the subject matter of any one of Examples 28-29 can optionally include wherein the one-time programmable storage device is an eFuse. In Example 31, the subject matter of any one of Examples 28-30 can optionally include wherein a software asset of the OEM system compares the OEM public ID stored in the processing device to another OEM public ID of the software asset to determine whether to execute the software asset on the processing device. In Example 32, the subject matter of any one of Examples 28-31 can optionally include wherein when the OEM public ID does not match the another OEM public ID of the software asset, an error condition is returned and the software asset is not executed by the processing device.

In Example 33, the subject matter of any one of Examples 28-32 can optionally include receiving, by the one-way cryptographic hash function, the OEM public ID from the one-time programmable storage device, receiving, by the one-way cryptographic hash function, a global key embedded in the processing device, generating, by the one-way cryptographic hash function, an OEM key using the OEM public ID and the global key as inputs, and providing the OEM key to security firmware executed by the processing device, wherein the security firmware is owned by the OEM system. In Example 34, the subject matter of any one of Examples 28-33 can optionally include wherein the OEM key is used by the security firmware to authenticate the device.

In Example 35, the subject matter of any one of Examples 28-34 can optionally include generating, by the one-way cryptographic hash function, an OEM key using the OEM public ID and a global key as inputs, wherein the global key is embedded in the processing device, generating, by the one-way cryptographic hash function, a device public ID from a root key of the processing device, generating, by the one-way cryptographic hash function, a device key from the OEM key and the device public key, and providing the device public ID and an authentication token to security firmware executed by the processing device, wherein the security firmware is owned by the OEM system. In Example 36, the subject matter of any one of Examples 28-35 can optionally include wherein the authentication token and the device public ID are used by the security firmware to authenticate the device.

Example 37 is an apparatus for implementing creation of secure Original Equipment Manufacturer (OEM) identifiers (IDs) in a processing device comprising means for receiving at a one-way cryptographic hash, a secret Original Equipment Manufacturer (OEM) key from an OEM system, means for generating at the one-way cryptographic hash function an OEM public identifier (ID) from the secret OEM key, and means for sending the OEM public ID to the one-time programmable storage device for storage. In Example 38, the subject matter of Example 37 can optionally include the apparatus further configured to perform the method of any one of the Examples 11 to 18.

Example 39 is at least one machine readable medium comprising a plurality of instructions that in response to being executed on a computing device, cause the computing device to carry out a method according to any one of Examples 10-18. Example 40 is an apparatus for creation of secure Original Equipment Manufacturer (OEM) identifiers (IDs) in a processing device, configured to perform the method of any one of Examples 10-18. Example 41 is an apparatus for implementing creation of secure Original Equipment Manufacturer (OEM) identifiers (IDs) in a processing device comprising means for performing the method of any one of claims 10 to 18. Specifics in the Examples may be used anywhere in one or more embodiments.

While the disclosure has been described with respect to a limited number of embodiments, those skilled in the art will appreciate numerous modifications and variations there from. It is intended that the appended claims cover all such modifications and variations as fall within the true spirit and scope of this disclosure.

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present disclosure.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 910 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:
1. A processing device, comprising:
a security firmware device;

a one-time programmable storage device having a secure memory to store an Original Equipment Manufacturer (OEM) key associated with the processing device; and a hardware execution core, operatively coupled to the one-time programmable storage device, to:

receive, from the one-time programmable storage device, an OEM public identifier for an OEM system;

produce an OEM key by applying a first cryptographic hash function to the OEM public identifier and a global key associated with a vendor of the OEM system;

produce a device public identifier by applying a second cryptographic hash function to a root key associated with the OEM system;

produce a device key by applying a third cryptographic hash function to the OEM key and the device public identifier; and provide the device key to the security firmware device, wherein the security firmware device authenticates the OEM system using an authentication token derived from the device key.

2. The processing device of claim 1, wherein each of the cryptographic hash functions comprises a SHA hash algorithm.

3. The processing device of claim 1, wherein the one-time programmable storage device is an eFuse.

4. The processing device of claim 1, wherein responsive to authentication of the OEM system, execute a software asset of the OEM system on the processing device.

5. The processing device of claim 1,
wherein the global key is embedded in the processing device.

6. A method, comprising:

receiving, by a hardware execution core of a processing device comprising a security firmware device and a one-time programmable storage device, an Original Equipment Manufacturer (OEM) public identifier for an OEM system;

producing an OEM key by applying a first cryptographic hash function to the OEM public identifier and a global key associated with a vendor of the OEM system;

producing a device public identifier by applying a second cryptographic hash function to a root key associated with the OEM system;

producing a device key by applying a third cryptographic hash function to the OEM key and the device public identifier; and providing, by the hardware execution core, the device key to the security firmware device, wherein the security firmware device authenticates the OEM system using an authentication token derived from the device key.

7. The method of claim 6, wherein each of the cryptographic hash functions comprises a SHA hash algorithm.

8. The method of claim 6, wherein the one-time programmable storage device is an eFuse.

9. The method of claim 6, wherein
the global key is embedded in the processing device.

10. An system comprising:
a security firmware device;
a memory to store an Original Equipment Manufacturer (OEM) key; and
a processing device communicably coupled to the memory, the processing device to:

receive an OEM public identifier for an OEM system;

produce an OEM key by applying a first cryptographic hash function to the OEM public identifier and a global key associated with a vendor of the OEM system;

produce a device public identifier by applying a second cryptographic hash function to a root key associated with the OEM system;

produce a device key by applying a third cryptographic hash function to the OEM key and the device public identifier; and provide the device key to the security firmware device, wherein the security firmware device authenticates the OEM system using an authentication token derived from the device key.

11. The system of claim 10, wherein each of the cryptographic hash functions comprises a SHA hash algorithm.

12. The system of claim 10, wherein
the global key is embedded in the processing device.

* * * * *